US012696911B2

(12) United States Patent
Krappen

(10) Patent No.: US 12,696,911 B2
(45) Date of Patent: Aug. 4, 2026

(54) MACHINE FOR MAKING FROZEN CONFECTIONARY PRODUCT IN RE-USEABLE PRODUCT TUBES

(71) Applicant: SOCIETE DES PRODUITS NESTLE S.A., Vevey (CH)

(72) Inventor: Edgar Heinrich Krappen, Tafers (CH)

(73) Assignee: Societe des Produits Nestle S.A., Vevey (CH)

( * ) Notice: Subject to any disclaimer, the term of this patent is extended or adjusted under 35 U.S.C. 154(b) by 1098 days.

(21) Appl. No.: 17/756,856

(22) PCT Filed: Dec. 3, 2020

(86) PCT No.: PCT/EP2020/084356
§ 371 (c)(1),
(2) Date: Jun. 3, 2022

(87) PCT Pub. No.: WO2021/110788
PCT Pub. Date: Jun. 10, 2021

(65) Prior Publication Data
US 2023/0011258 A1 Jan. 12, 2023

(30) Foreign Application Priority Data
Dec. 6, 2019 (EP) ..................................... 19214256

(51) Int. Cl.
| | |
|---|---|
| *A23G 9/28* | (2006.01) |
| *A23G 9/22* | (2006.01) |
| *G07F 17/00* | (2006.01) |

(52) U.S. Cl.
CPC ............. *A23G 9/285* (2013.01); *A23G 9/225* (2013.01); *A23G 9/288* (2013.01); *G07F 17/0071* (2013.01)

(58) Field of Classification Search
CPC . A23G 9/22; A23G 9/225; A23G 9/28; A23G 9/281; A23G 9/283; A23G 9/285;
(Continued)

(56) References Cited

U.S. PATENT DOCUMENTS

| | | | |
|---|---|---|---|
| 1,642,200 A | 9/1927 | Hall | |
| 2,148,451 A | 2/1939 | Elliott, Sr. | |

(Continued)

FOREIGN PATENT DOCUMENTS

| | | |
|---|---|---|
| CN | 107533779 A | 1/2018 |
| CN | 108471774 A | 8/2018 |

(Continued)

OTHER PUBLICATIONS

Chinese Office Action for Appl No. 202080084047.4 dated Jul. 29, 2023.

(Continued)

*Primary Examiner* — Edward F Landrum
*Assistant Examiner* — Adam M Eckardt
(74) *Attorney, Agent, or Firm* — K&L Gates LLP

(57) ABSTRACT

A dispensing machine for dispensing a frozen confectionary product, the machine comprising: a first storage area for storing a first storage tray with one or more first tubes, a serving station comprising a first position under the one or more first tubes for receiving a container, a means for extruding frozen confectionary out of the tubes, a cutting device for cutting at least a portion of the frozen confectionary into the container. The dispensing machine further comprises means for transferring the one or more first tubes in the first storage area to the serving station and from the serving station to a storage area, and at least two zones comprising a first zone wherein the temperature is lower than the temperature in the second zone, and wherein the (Continued)

FRONT VIEW first storage area is located in the first zone and the serving station is located in the second zone.

14 Claims, 16 Drawing Sheets

(58) Field of Classification Search
CPC .............. A23G 9/288; H04N 21/4383; H04N 21/4384; H04N 21/4524; H04N 21/2385; H04N 21/426; H04N 21/438; H04N 21/45; H04N 21/462; H04N 5/44; H04N 5/445; G07F 17/0071; G07F 17/00; G07F 13/06; G07F 13/10
See application file for complete search history.

(56) References Cited

U.S. PATENT DOCUMENTS

| | | | |
|---|---|---|---|
| 2,495,077 A | 1/1950 | Protzeller | |
| 2,555,984 A | 6/1951 | Mercier et al. | |
| 3,876,110 A | 4/1975 | Logie | |
| 4,420,948 A | 12/1983 | Savage | |
| 5,027,698 A * | 7/1991 | Chirnomas | G07F 13/10 |
| | | | 221/150 HC |
| 5,405,054 A | 4/1995 | Thomas | |
| 7,448,516 B2 * | 11/2008 | Davis | G07F 13/025 |
| | | | 222/146.6 |
| 8,989,893 B2 * | 3/2015 | Jones | A23G 9/22 |
| | | | 221/24 |
| 11,076,613 B2 * | 8/2021 | Mohammed | G01F 23/16 |
| 2009/0120306 A1 * | 5/2009 | DeCarlo | A23G 9/224 |
| | | | 62/340 |
| 2009/0224419 A1 | 9/2009 | Anderson | |
| 2017/0332661 A1 * | 11/2017 | McGill | B29C 45/2628 |

FOREIGN PATENT DOCUMENTS

| | | |
|---|---|---|
| EP | 0995685 | 4/2000 |
| GB | 502552 | 3/1939 |
| GB | 2230057 | 10/1990 |
| GB | 2230057 A | 10/1990 |
| WO | 2004103831 | 12/2004 |
| WO | 2004107873 | 12/2004 |
| WO | 2012007770 | 1/2012 |
| WO | 2014184579 | 11/2014 |

OTHER PUBLICATIONS

European Office Action for Appl No. 20 815 861.8-1105 dated Jul. 25, 2023.

* cited by examiner

FRONT VIEW

Transport Tray with locking flaps and stacking flaps

TRAY FOR TUBE TRANSPORT
( TOP VIEW )
( 4 X 8 tubes in reality )

IC Tube locked on transport and storage tray

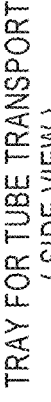
TRAY FOR TUBE TRANSPORT
(SIDE VIEW)
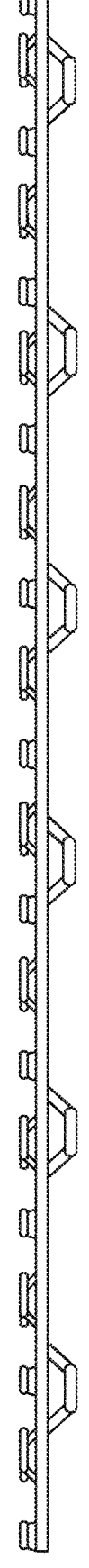
FIG. 7

33 — Bar up and down moveable

3 Axis robotic arm with sytems

31 — 3 Axis Arm 270° turnable

34 — Tube changer plate 180° turnable

30 — Lifting suction head to pick & place wafer

32 — SLIDE GATE OPENER TOPPING TUBE

FRONT VIEW

SIDE VIEW

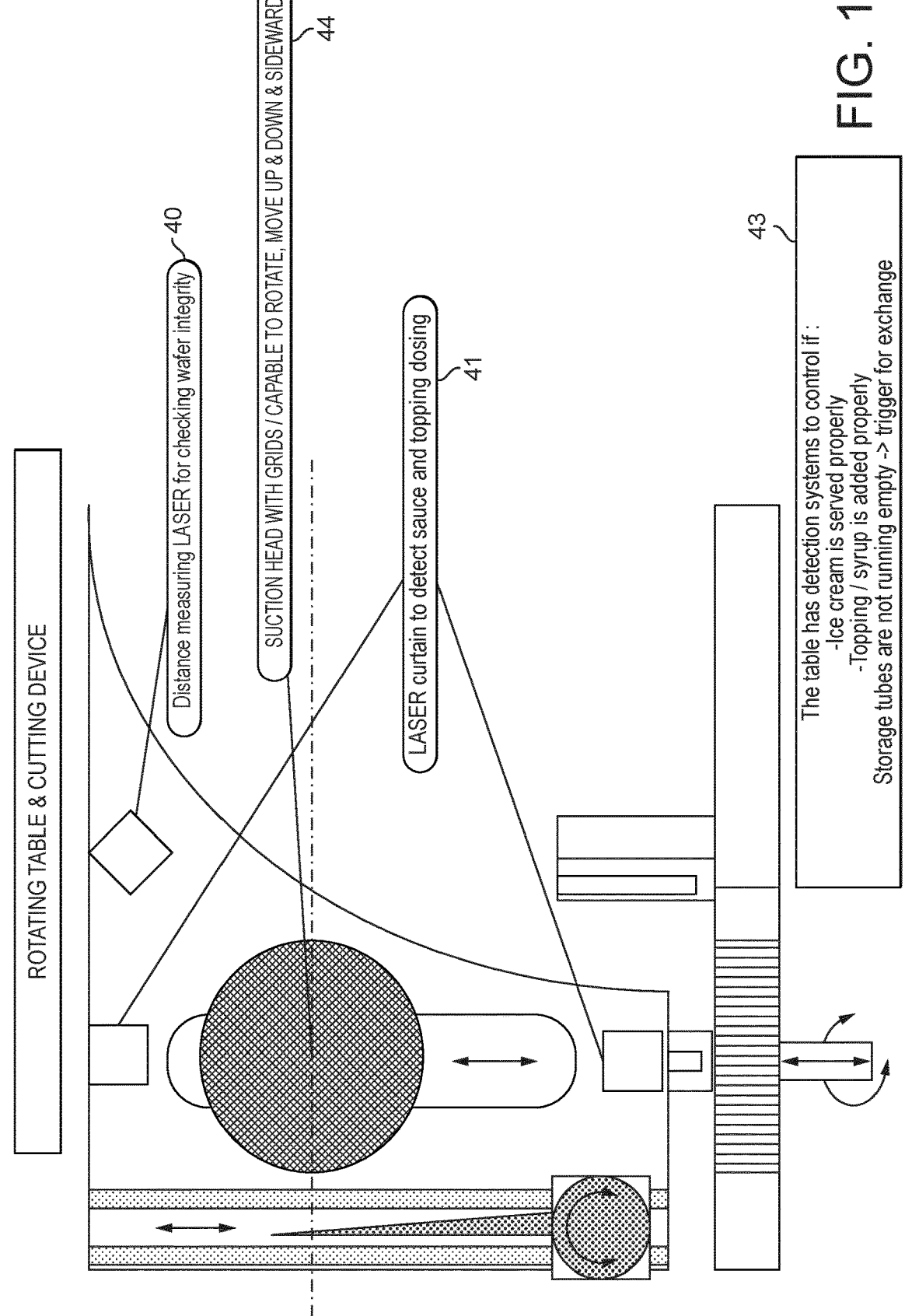

ROTATING TABLE & CUTTING DEVICE

Distance measuring LASER for checking wafer integrity 40

SUCTION HEAD WITH GRIDS / CAPABLE TO ROTATE, MOVE UP & DOWN & SIDEWARDS 44

LASER curtain to detect sauce and topping dosing 41

The table has detection systems to control if :
-Ice cream is served properly
-Topping / syrup is added properly
Storage tubes are not running empty -> trigger for exchange 43

FIG. 10

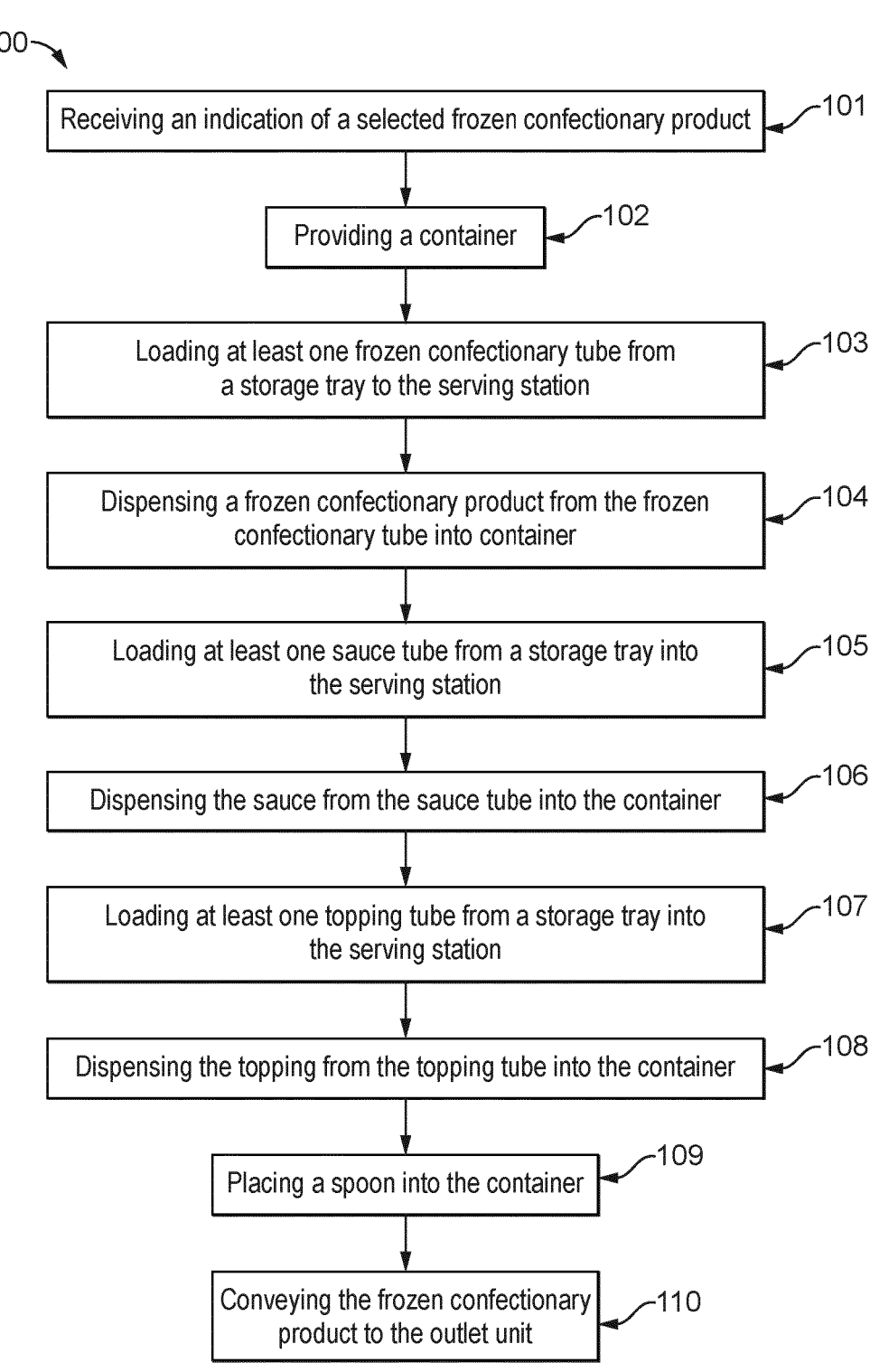

100

Receiving an indication of a selected frozen confectionary product — 101

Providing a container — 102

Loading at least one frozen confectionary tube from a storage tray to the serving station — 103

Dispensing a frozen confectionary product from the frozen confectionary tube into container — 104

Loading at least one sauce tube from a storage tray into the serving station — 105

Dispensing the sauce from the sauce tube into the container — 106

Loading at least one topping tube from a storage tray into the serving station — 107

Dispensing the topping from the topping tube into the container — 108

Placing a spoon into the container — 109

Conveying the frozen confectionary product to the outlet unit — 110

Providing a tube comprising a first flap, a locking flap and a sealing cap — 201

Filling the tube with a frozen confectionary, a topping, or a sauce — 202

Placing the tube onto a storage tray — 203

Placing the storage tray in a box — 204

Transporting the box from a remote location to a dispensing unit — 205

Placing the storage tray directly into the dispensing unit — 206

MACHINE FOR MAKING FROZEN CONFECTIONARY PRODUCT IN RE-USEABLE PRODUCT TUBES

CROSS REFERENCE TO RELATED APPLICATIONS

The present application is a National Stage of International Application No. PCT/EP2020/084356, filed on Dec. 3, 2020, which claims priority to European Patent Application No. 19214256.0, filed on Dec. 6, 2019, the entire contents of which are being incorporated herein by reference.

FIELD OF THE INVENTION

The present disclosure generally relates to frozen food compositions such as frozen confectionary products. More particular, the present invention relates to a dispensing machine for dispensing frozen confectionary product.

BACKGROUND

Dispensing of frozen confectionary products is typically done by an operator working at a counter, truck, or kiosk. However, the speed at which a consumer is able to receive a frozen confectionary product is greatly limited by the speed at which the operator is able to prepare the frozen confectionary product. Moreover, when the frozen confectionary product comprises multiple flavors, sauces, and/or toppings, the time to dispense the frozen confectionary product increases.

Additionally, dispensing of frozen confectionary products generates a great deal of waste. For example, each frozen confectionary flavor, sauce and/or topping is stored in a separate container prior to being dispensed to a consumer. Moreover, the containers holding the frozen confectionary product dispensed to the consumers and the spoons used in frozen confectionary products can all generate waste.

Vending machines with frozen wrapped or packed frozen confectionary products exist. The wrapping and packaging material is disposed as waste when the product is consumed.

There is a need to reduce waste of packaging material in order to preserve the environment.

There is also a need for sustainable vending solutions for frozen products such as frozen confectionary.

OBJECT OF THE INVENTION

It is the object of present invention to provide a sustainable dispensing machine, which provides a solution to one or more or all of the above-mentioned needs.

SUMMARY OF THE INVENTION

The present invention provides the improvement by a dispensing machine, which can dispense product from re-usable tubes. The dispensing machine design allows products to be prepared from multiple frozen confectionary flavours and topping and/or sauces. The dispensing machine removes the need for wrapping of the product and thus provides zero waste of packaging material.

In a first aspect, the present invention relates to a dispensing machine for dispensing a frozen confectionary product, the machine comprising:

a first storage area for storing a first storage tray with one or more first tubes in the dispensing machine, a serving station for receiving one or more first tubes comprising a composition that is a frozen confectionary from the first storage tray, the serving station comprises a first position under the one or more first tubes for receiving a container, a means for extruding the frozen confectionary out of the tubes located in the serving station, a cutting device for cutting at least a portion of the frozen confectionary into the container, and means for transferring the one or more first tubes in the first storage area to the serving station and from the serving station to a storage area, and wherein the one or more first tubes are reusable; and at least two zones, the at least two zones comprising a first zone wherein the temperature is lower than the temperature in the second zone, and wherein the first storage area is located in the first zone and the serving station is located in the second zone.

By means of the dispensing machine according to the present invention, the consumer can receive a customizable frozen confectionary product from an automated dispensing machine.

In the dispensing machine according to the invention, one or more tubes containing a frozen confectionary or a component of a frozen confectionary, can be placed on a storage tray and transferred from a production facility to a dispensing machine. The tubes can be placed directly in the dispensing machine without the need to transfer the tubes off the storage tray or the contents of the tubes (i.e., the frozen confectionary or a component of a frozen confectionary) out of the tubes.

The frozen confectionary and/or component thereof provides a consumer with a customizable frozen confectionary product.

In an embodiment of the invention the dispensing machine can also identify when a tube is below a predetermined threshold and then send the tube to a second location (i.e., the production facility or an intermediate location) to be subsequently cleaned and reused.

For example, a tube can be filled with a frozen confectionary at a production facility and placed on a tray. The tray can be shipped to a dispensing machine and placed in the dispensing machine to provide a consumer with a customizable frozen confectionary product. After the tube is used, the tube can be collected, washed and reused (e.g., re-filled with another frozen confectionary product). Preferably, the tubes can be washed at a production facility and then delivered to a production line located in the facility to be re-filled. Preferably, the refilled frozen confectionary tubes can be placed on a tray to be shipped back to the dispensing machine in, for example, a refrigerated shipping box.

In a preferred embodiment, the means for transferring the one or more first tubes in the first storage area to the serving station and from the serving station back to the first storage area. This allows for a compact layout of the dispensing machine. In this embodiment, the first tubes are returned back in the first tube trays and there is no need for additional storage space is needed. Once the first trays are filled empty first tubes then tray can be removed from the dispensing machine, and the tubes washed and re-used.

BRIEF DESCRIPTION OF THE DRAWINGS

In the drawings which illustrate example embodiments of this invention:

FIG. 7 is a side view of a storage tray that may be used in a dispensing machine according to the invention.

FIG. 10 is a view of a rotating table and cutting unit that may be used to dispense the frozen confectionary product in a dispensing machine according to the invention.

FIG. 14 is a flowchart showing a non-limiting example of a method of making use of a dispensing machine according to the invention herein.

DETAILED DESCRIPTION OF THE INVENTION

Figure 1:
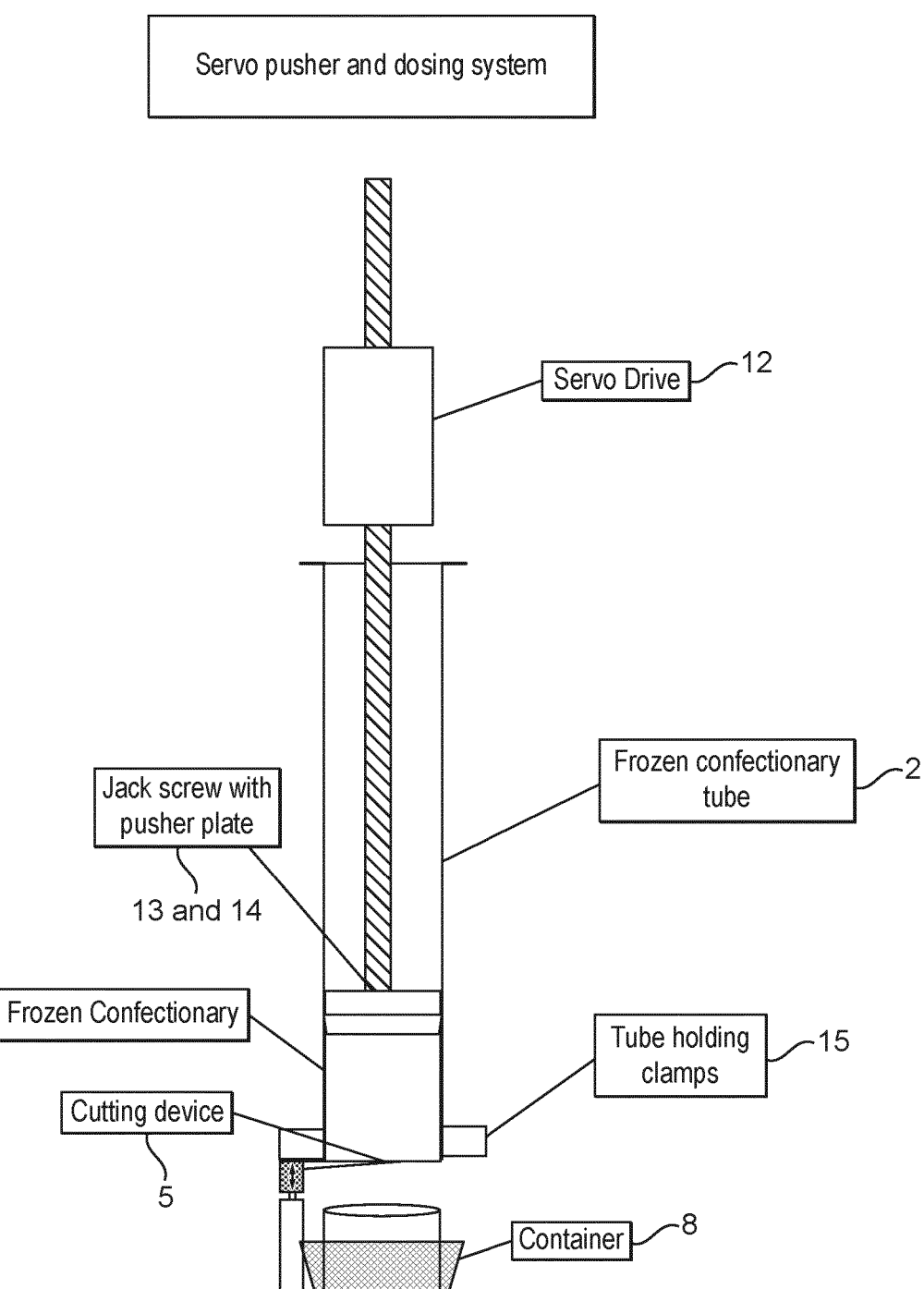
FIG. 1 is a view of a frozen confectionary tube that may be used in a dispensing machine according to the invention.

With the dispenser according to the invention, it is possible to re-use one of more tubes. For example, the frozen confectionary composition made at the factory can be provided in the tubes.

The dispensing device allows the loading of one or more first tubes comprising a composition that is a frozen confectionary or a component of a frozen confectionary from a first storage tray located in a first storage area to a serving station; dispensing at least a portion of the composition that is a frozen confectionary or a component of a frozen confectionary from at least one of the one or more first tubes into a container; optionally placing a spoon into the container; and conveying the frozen confectionary product to an outlet. Preferably the first storage area, the serving station, and the outlet are located at the same venue.

In a preferred embodiment of the machine it comprises a second storage area separate from the first storage area for storing a second storage tray comprising one or more second tubes comprising an additional component, means for transferring the one or more second tubes from the second storage area to the serving station, and wherein the serving station comprises a second position under the one or more of the second tubes for receiving a container. The second storage area may comprise toppings or sauce, which allows the multiple variations of the decorations of the frozen confectionary that can be added to the product.

The confectionary component may comprise a frozen confectionary sauce, for example, a syrup or a hot fudge. In an embodiment, the additional confectionary component may comprise a frozen confectionary topping, for example, nuts, candies, fruit or sprinkles.

These components may be provided in the second tube or tubes.

A dispensing machine preferably comprises a third zone wherein the second storage area is positioned, and wherein the temperature of the third zone is higher than the temperature of the first zone.

The temperature of the first zone is preferably −20 to −16° C., the temperature of the second zone is preferably −10 to −6° C., and the temperature of the third zone is preferably ambient temperature, e.g. from 6° C. to 8° C.

Advantages, the dispensing machine according to the invention comprises means for transferring the one or more first tubes is a robotic arm, preferably a robotic arm comprising a tube changer plate configured to grip the one or more first tubes. This has the benefit that the dispensing machine can run without an operator. It also allows a fast and consistent preparation of the product. Finally, the use of one or more robotic arms allows for a compact design of the dispensing machine.

To automate the preparation of the frozen confectionary product, the dispensing machine may comprises means for conveying the frozen confectionary product to an outlet on the dispensing machine.

Preferably the machine comprises heaters for heating the one or more second tubes in the serving station prior to dispensing the portion of the component of the frozen confectionary into the container. This allows product to be created with both hot and cold elements.

To facilitate the running of the dispensing machine it comprises means for detecting when contents of one of the one or more first tubes is below a pre-determined threshold, and means for moving the one of the one or more first tubes having contents below the pre-determined threshold into an empty tube location in a tray located in the dispensing machine.

For example, when detecting that the contents of a tube are below a pre-determined threshold; transferring the substantially emptied tube to an empty tube tray located in the dispensing machine; shipping the emptied tube tray to a location different from the dispensing machine (e.g., the production facility or an intermediate location); cleaning the emptied tubes at the location different from the dispensing machine; transferring the cleaned tubes to a production line (e.g., the production facility); and filling the cleaned tubes with a frozen confectionary or a component of a frozen confectionary.

When the dispensing machine is in the form of a vending machine the machine may advantageously comprise a user interface for receiving an indication of a type of frozen confectionary product to be dispensed.

To facilitate the handling of the tubes in the dispensing machine the tube may comprise a first flap located on a first end of the tube and a second locking flap located on a second end of the tube.

Furthermore, the tube comprises a sealing cap, preferably a sealing cap configured to be pushed into the tube may be used.

The dispensing machine preferably comprises a door for receiving and removing trays with tubes. The position of the tubes in the trays facilitates the filling and replacement of the tubes in the storage areas.

In one embodiment the machine according to the invention may comprise a buffer unit located in the dispensing machine prior to conveying the frozen confectionary product to the outlet.

To ease the position of the frozen confectionary portions cut from the tubes, the dispensing machine may comprise a rotating table located in the dispensing machine on which the containers can be placed. Preferably, the tubes have an inner profile having a shape selected from the group consisting of a disc, a star, a hexagon, a square or a polygon. This allows a variation of the shape of the portions of the frozen confectionary.

It should be appreciated that various embodiments of the present disclosure can be combined with other embodiments of the disclosure and are merely illustrative of specific ways to make and use the disclosure and do not limit the scope of the disclosure when taken into consideration with the claims and the following detailed description.

As used in this disclosure and the appended claims, the singular forms "a," "an" and "the" include plural referents unless the context clearly dictates otherwise. Thus, for example, reference to "an ingredient" or "the ingredient" includes two or more ingredients.

The words "comprise," "comprises" and "comprising" are to be interpreted inclusively rather than exclusively. Likewise, the terms "include," "including" and "or" should all be construed to be inclusive, unless such a construction is clearly prohibited from the context. Nevertheless, the compositions disclosed herein may lack any element that is not specifically disclosed herein. Thus, a disclosure of an embodiment using the term "comprising" includes a disclosure of embodiments "consisting essentially of" and "consisting of" the components identified.

The term "and/or" used in the context of "X and/or Y" should be interpreted as "X," or "Y," or "X and Y." Similarly, "at least one of X or Y" means "X" or "Y," or "X and Y." Where used herein, the terms "example" and "such as," particularly when followed by a listing of terms, are merely exemplary and illustrative and should not be deemed to be exclusive or comprehensive.

As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number. All numerical ranges herein should be understood to include all integers, whole or fractions, within the range. Moreover, these numerical ranges should be construed as providing support for a claim directed to any number or subset of numbers in that range. For example, a disclosure of from 1 to 10 should be construed as supporting a range of from 1 to 8, from 3 to 7, from 1 to 9, from 3.6 to 4.6, from 3.5 to 9.9, and so forth.

The term "frozen confectionary" refers to any frozen or chilled confection. Non-limiting examples are ice cream, sorbet, sherbet, water ice, frozen yogurt, frozen dairy, soft ice, granitas, mellorine, frozen custard, non-dairy frozen confection, milk ice, ice lolly, gelato or frozen jelly, or chilled desserts such as mousses, whipped yogurt, milk shakes or smoothie or coffee latté.

The term "topping" refers to any topping for a frozen or chilled confection. Non-limiting examples are nuts, sprinkles, fruit, or candies.

The term "sauce" refers to any sauce for a frozen or chilled confection. Non-limiting examples include chocolate syrup, caramel, hot fudge, strawberry sauce, or other syrups.

The term "frozen confectionary component" refers to a topping and/or a sauce for a frozen confectionary.

The term "frozen confectionary product" refers to a frozen confectionary and any sauce and/or topping.

FIG. 1

FIG. 1 is a front view of a frozen confectionary tube 2 that may be used in the presently disclosed machine. The frozen confectionary tube 2 may have a circular cross-section, such as a circular opening of the tube and/or a circular bottom surface of the tube. However, the present disclosure is not limited to a specific shape of the tube and additional shapes such as a star, hexagon, square or polygon are contemplated. The frozen confectionary tube may be made of stainless steel, for example.

The frozen confectionary tube 2 may be held in a specific position and/or location by tube holding clamps 15. Preferably the tube holding clamps 15 are configured to prevent the frozen confectionary tube 2 from moving out of place when positioned in a dispensing machine 1 as described in greater detail hereafter.

In an embodiment, the frozen confectionary tube 2 may interact with a servo drive 12 which is preferably connected to a jack screw 13 and/or a pusher plate 14 to control the amount of the frozen confectionary dispensed from the frozen confectionary tube 2. For example, the servo drive 12 may drive the jack screw 13 and/or the pusher plate 14 to dispense a specified amount of frozen confectionary from the frozen confectionary tube 2. The servo drive 12 may be controlled by a controller 27. Preferably a cutting device 5 may be used to slice the frozen confectionary. For example, the cutting device 5 may comprise a slicer or a heated wire configured to cut the frozen confectionary. The frozen confectionary may be dispensed into a container 8.

FIG. 2

Figure 2:
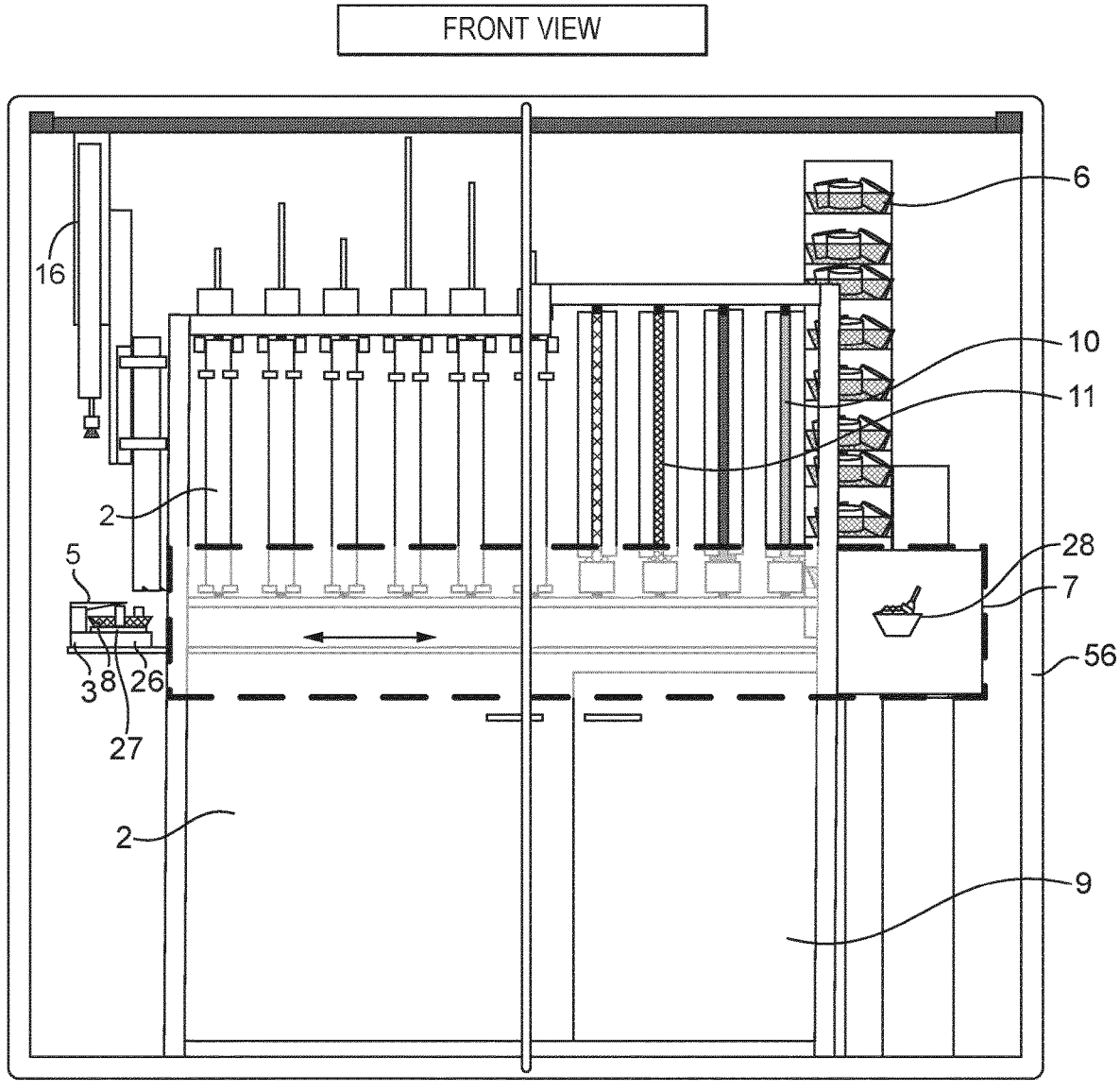
FIG. 2 is a front view of a dispensing machine that may be used in a dispensing machine according to the invention.

FIG. 2 is a front view of an embodiment of the dispensing machine 1. The dispensing machine 1 may comprise one or more of the servo drive 12, the jack screw 13 or the pusher plate 14.

The dispensing machine 1 may be configured to automatically dispense a frozen confectionary product. For example, the dispensing machine 1 may comprise a rotating table 3 configured to hold and move the container 8 into a first position for receiving a first frozen confectionary from a first frozen confectionary tube 2. In an embodiment, after receiving a first frozen confectionary, the rotating table 3 may move the container 8 into a second position to receive a second frozen confectionary from a second frozen confectionary tube 2 and so forth. Preferably the rotating table 3 is configured to move sideways or front and back through the dispensing machine 1 to receive one or more frozen confectionaries and deliver a resultant frozen confectionary product 28 to an outlet 7 from which a consumer may remove the frozen confectionary product 28 from the dispensing machine 1 (i.e., the dispensing process).

Preferably the rotating table 3 moves through a visible area 26 that is visible to consumers outside the dispensing machine 1.

The dispensing machine 1 may comprise the outlet 7, which can convey the frozen confectionary product 28 to the consumer. The dispensing machine 1 may comprise a user interface 56. A consumer may enter information regarding a type and/or an amount of frozen confectionary into the user interface 56 (e.g., selected from options displayed by the user interface 56). The information may be conveyed to the controller 27 which can be at least partially located in the rotating table 3.

The dispensing machine 1 may comprise a buffer unit 6. The buffer unit 6 may receive the frozen confectionary product 28 from the rotating table 3. The buffer unit 6 may be used to store the frozen confectionary product 28 in the dispensing machine 1 after production from the corresponding frozen confectionary tube 2 and/or prior to conveying the frozen confectionary product 28 to the consumer. In an embodiment, the buffer unit 6 may remove a frozen confectionary product 28 from the outlet 7 that has not been picked up by a consumer within a pre-determined time.

Optionally the dispensing machine 1 may further comprise one or more topping tubes 10 and/or one or more sauce tubes 11. The rotating table 3 may be configured to move the container 8 into one or more further positions whereby the container 8 may receive toppings from the topping tubes 10 and/or sauces from the sauce tubes 11.

FIG. 3

Figure 3:
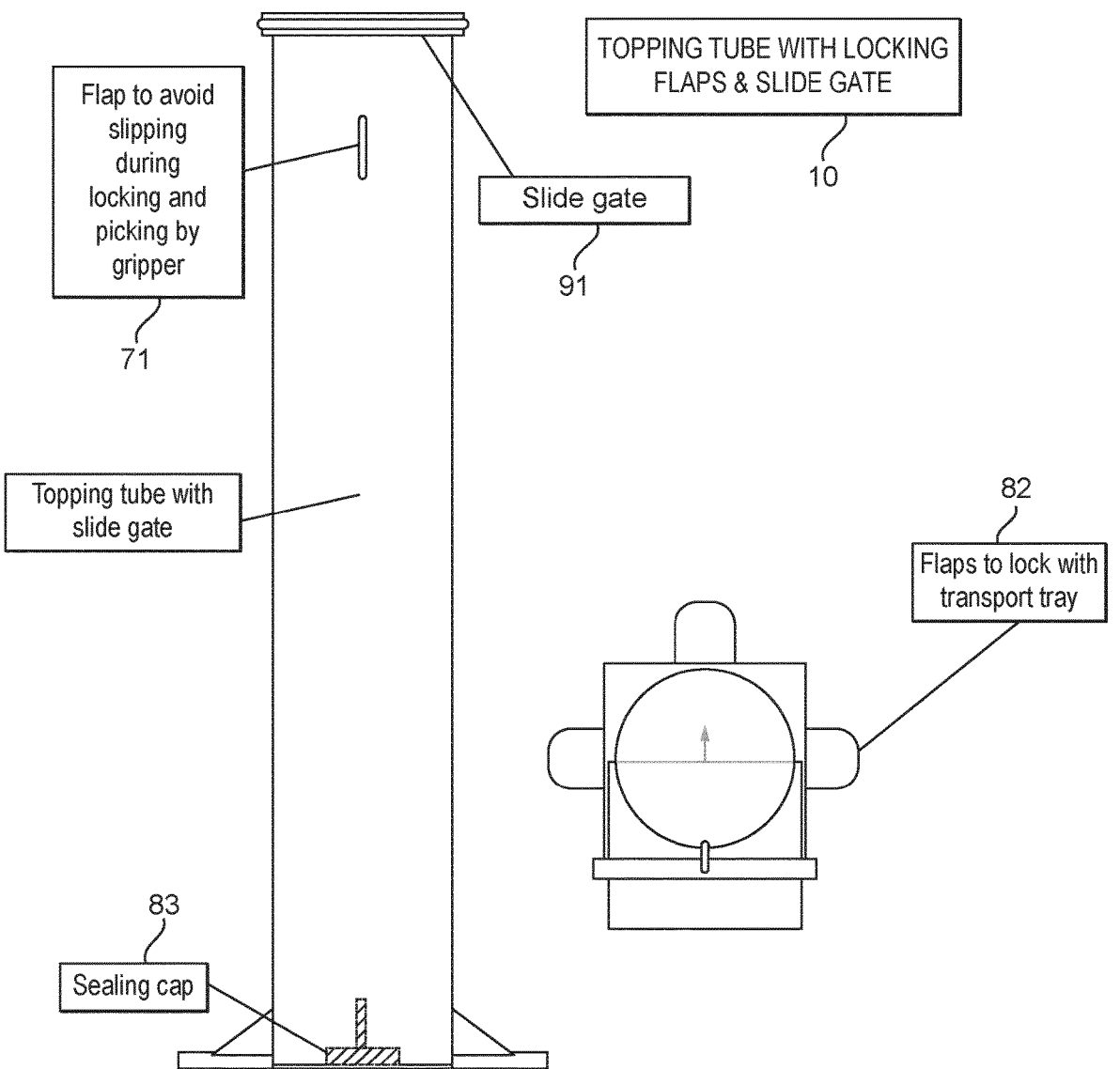
FIG. 3 is a view of a topping tube that may be used to dispense the frozen confectionary product in a dispensing machine according to the invention.

FIG. 3 depicts an example of a topping tube 10 that may be used in an embodiment of the presently disclosed dispensing machine. The topping tube 10 may comprise a first flap 81 to prevent slipping when the topping tube 10 is moved as will be discussed later in greater detail. The topping tube 10 may further comprise a locking flap 82 to lock the topping tube into a storage tray 95 and/or the dispensing machine 1. The topping tube 10 may further comprise a slide gate 91 which may be removed to allow the topping tube 10 to be filled with toppings and/or to allow the topping tube 10 to dispense toppings into the container 8. The topping tube 10 may further comprise a sealing cap 83. The sealing cap 83 can keep the toppings in the topping tube 10.

FIG. 4

Figure 4:
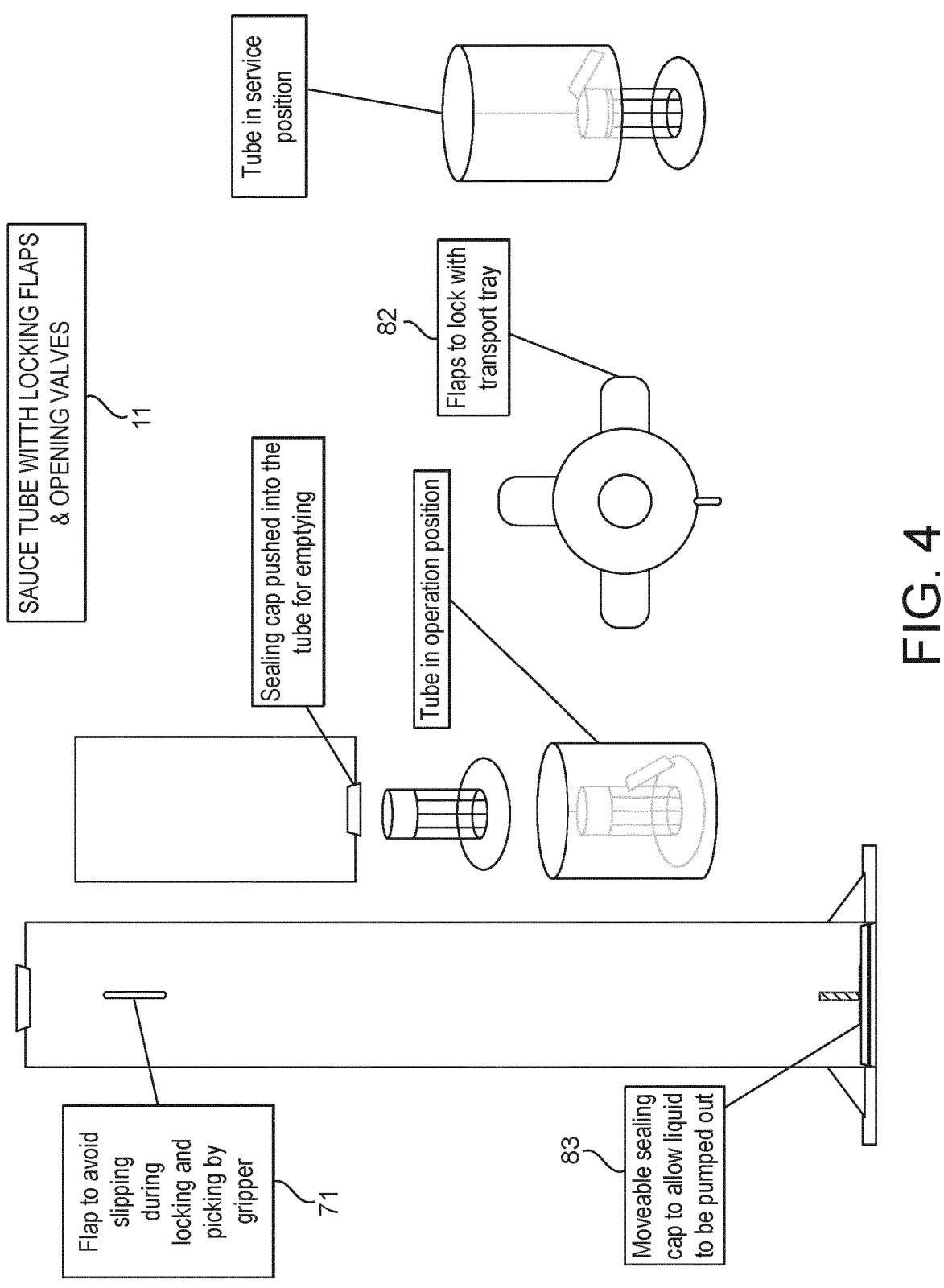
FIG. 4 is a view of a sauce tube that may be used in a dispensing machine according to the invention.

FIG. 4 depicts an example of a sauce tube 11 for use in an embodiment of the presently disclosed dispensing machine. The sauce tube 11 may comprise a first flap 81 to prevent slipping when the sauce tube 11 is moved. The sauce tube 11 may further comprise a locking flap 82 to lock the sauce tube 11 into the storage tray 95 and/or the dispensing machine 1. The sauce tube 11 may further comprise a slide gate 91 which may be removed to allow the sauce tube 11 to be filled with sauce and/or to allow the sauce tube 11 to dispense sauce into the container 8. The sauce tube 11 may comprise a sealing cap 83. The sealing cap 83 may prevent the sauce from leaking out of the sauce tube 11.

FIG. 5

Figure 5:
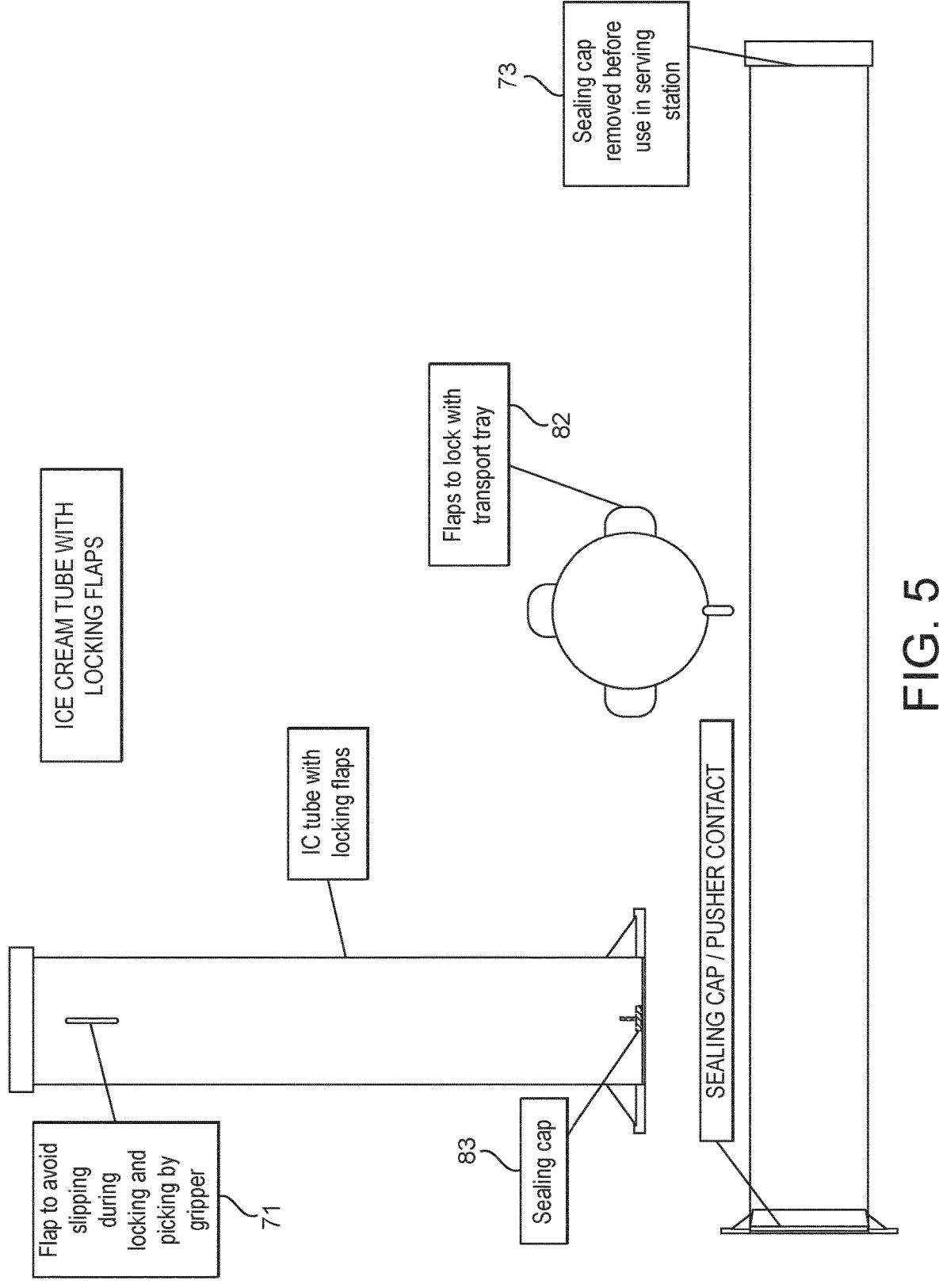
FIG. 5 is a view of a frozen confectionary tube that may be used in a dispensing machine according to the invention.

FIG. 5 depicts an example of the frozen confectionary tube 2 for use in an embodiment of the presently disclosed dispensing machine. The frozen confectionary tube 2 may comprise a first flap 81 to prevent slipping when the frozen confectionary tube 2 is moved. The frozen confectionary tube 2 may further comprise a locking flap 82 to lock the frozen confectionary tube 2 into the storage tray 95 and/or the dispensing machine 1. The frozen confectionary tube 2 may further comprise a slide gate 91 which may be removed to allow the frozen confectionary tube 2 to be filled with frozen confectionary and/or to allow the frozen confectionary tube 2 to dispense frozen confectionary into the container 8. The frozen confectionary tube 2 may comprise a sealing cap 83. The sealing cap 83 may prevent the frozen confectionary from leaking out of the frozen confectionary tube 2. In an embodiment, the slide gate 91 and/or the sealing cap 83 may act as a contact point for the pusher plate 14.

FIG. 6; FIG. 7

Figure 6:
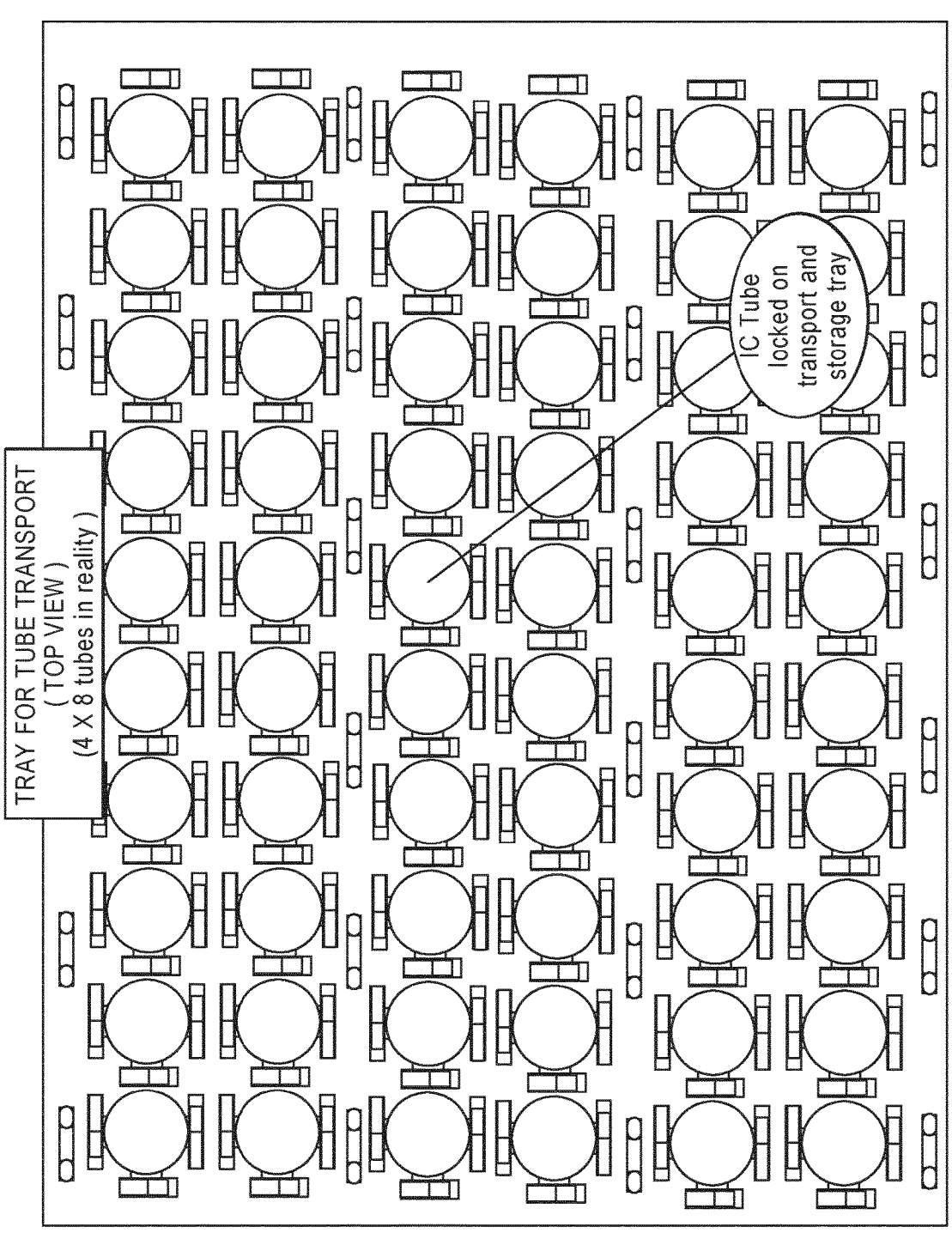
FIG. 6 is a top view of a storage tray that may be used to transport the tubes to be used in an embodiment of the dispensing machine according to the invention.
Figures 8A, 8B:
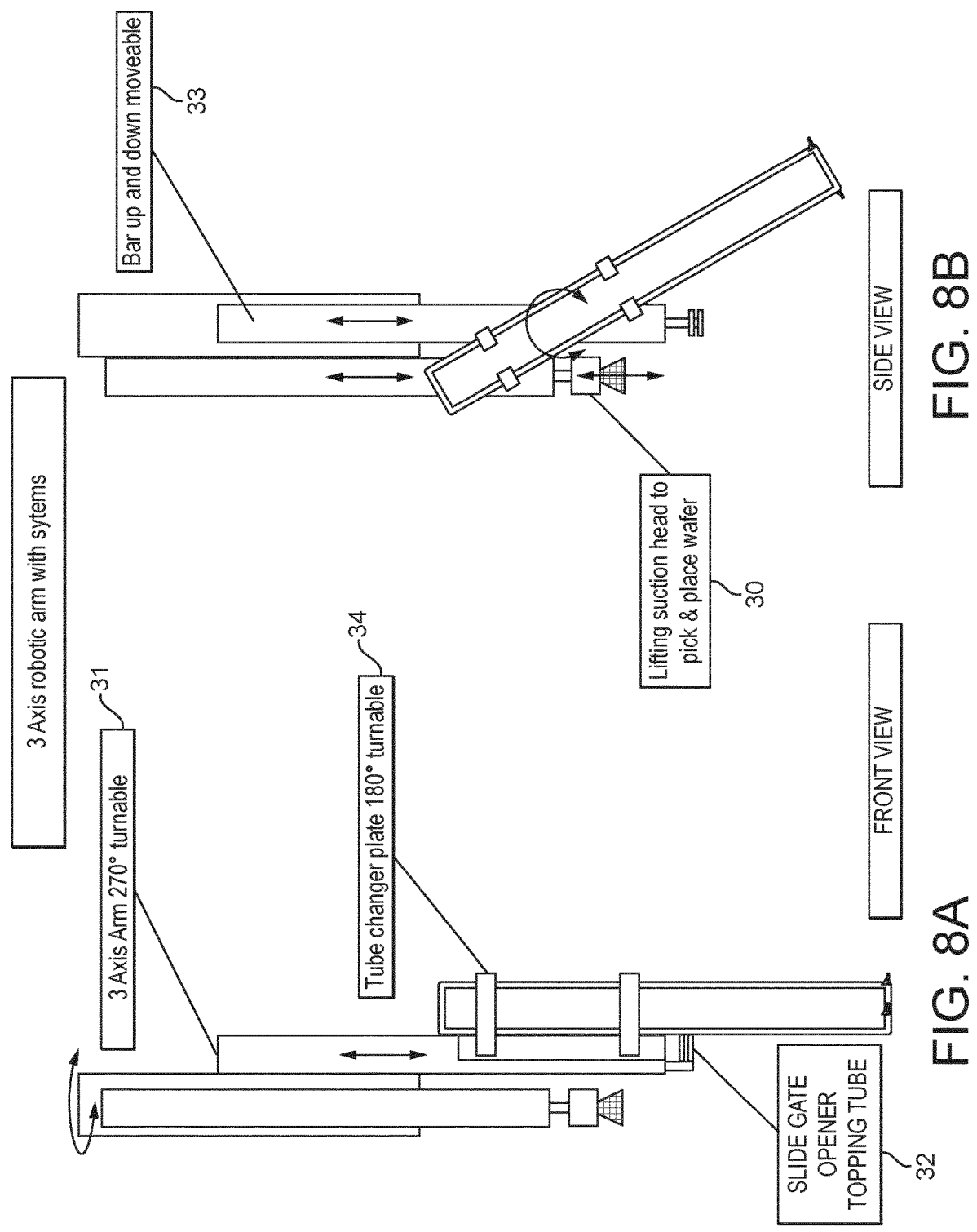
FIG. 8A is a front view of an arm that may be used in a dispensing machine according to the invention.
FIG. 8B is a side view of an arm that may be used in a dispensing machine according to the invention.

In a preferred embodiment, the storage tray 95 is a stainless steel tray. FIG. 6 depicts a top view of an embodiment of the storage tray 95 which may be used to transport the tubes with the tube holding clamps 15. FIG. 7 depicts a side view of an embodiment of the storage tray 95 for transport. The storage tray 95 may be configured to allow the frozen confectionary tubes 2, the topping tubes 10, and/or the sauce tubes 11 to be locked and unlocked by an arm 16 located in the dispensing machine 1. The storage tray 95 is preferably configured to be stacked on top of a second storage tray 95 for ease in transport.

In a preferred embodiment, the dispensing machine 1 may further comprise one or more arms 16 for moving the frozen confectionary tubes 2, the topping tubes 10, and/or the sauce tubes 11 from the storage tray 95 located in a storage area to a serving station as will be discussed in greater detail later.

FIG. 9

Figure 9:
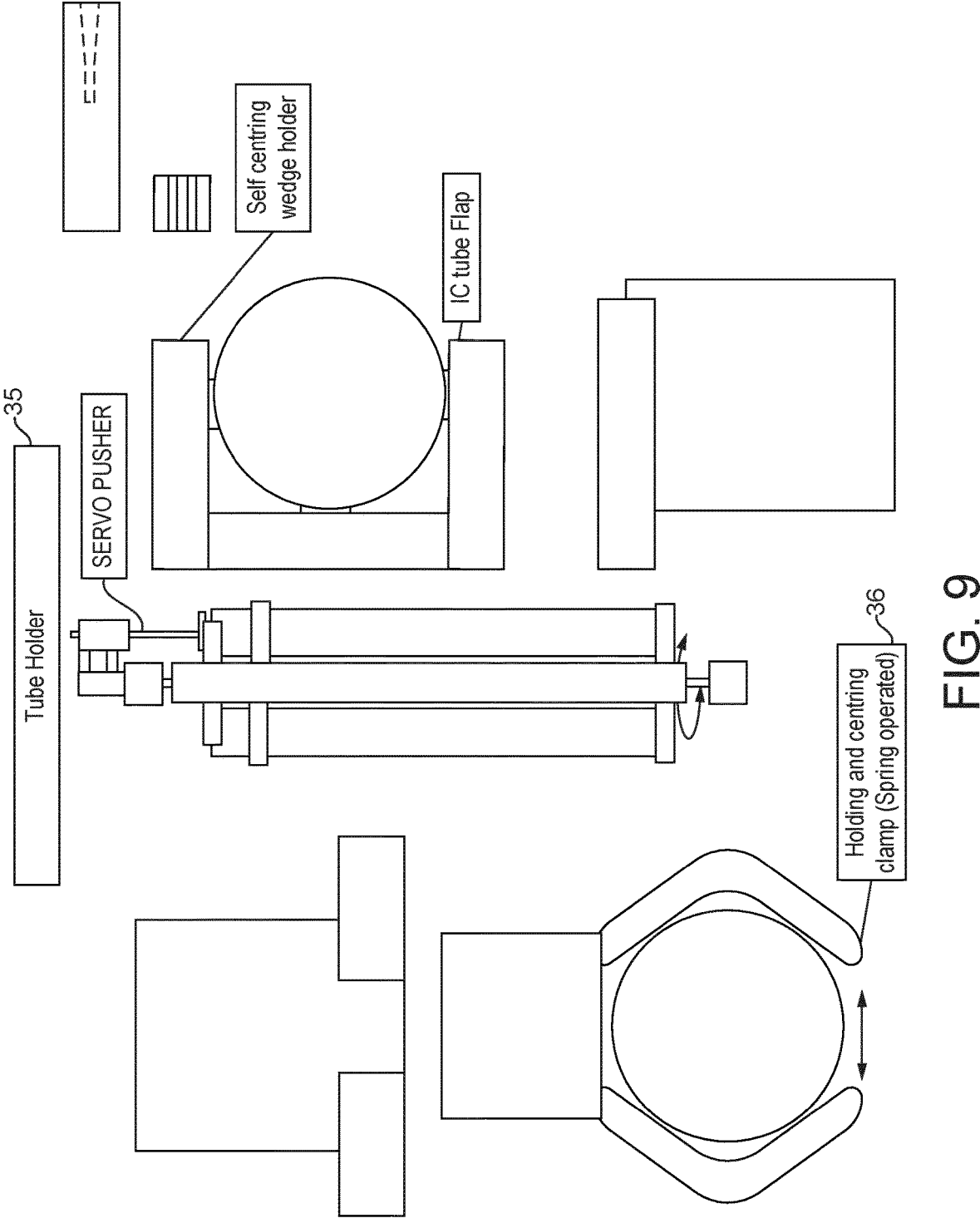
FIG. 9 is a view of a tube holder that may be used to dispense the frozen confectionary in a dispensing machine according to the invention.

The dispensing machine 1 may further comprise a tube holder 35. FIG. 9 shows the tube holder 35 which may be configured to hold the frozen confectionary tubes 2, the sauce tubes 11, and/or the topping tubes 10. For example, a spring operated holding clamp 36 may be used to hold the frozen confectionary tubes 2, the sauce tubes 11, and/or the topping tubes 10 in place during transferring of the frozen confectionary tubes 2, the topping tubes 10, and/or the sauce tubes 11 from the storage tray and during dispensing of the frozen confectionary components from the frozen confectionary tubes 2, the topping tubes 10, and/or the sauce tubes 11.

FIG. 10; FIG. 11

Figure 11:
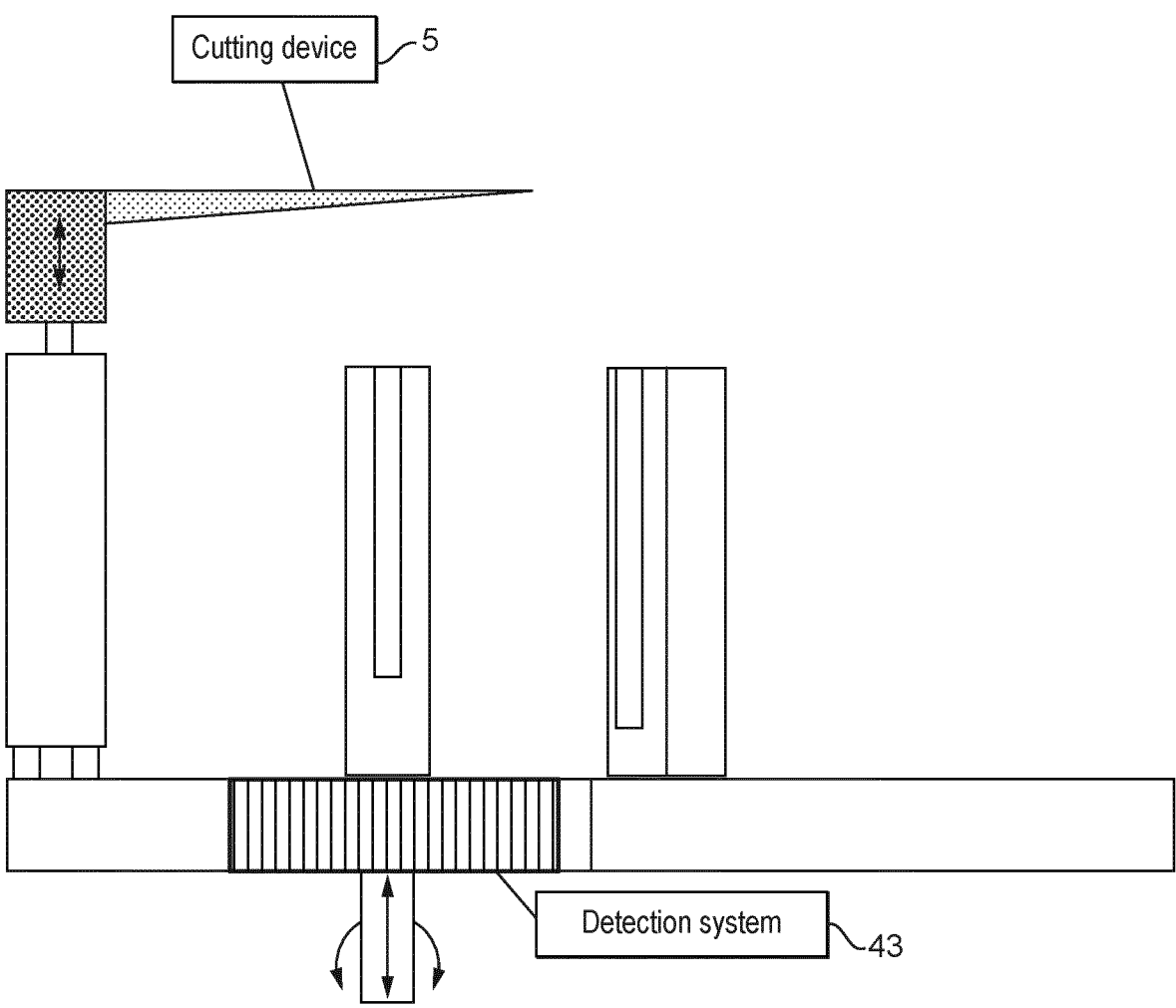
FIG. 11 is a view of a rotating table and cutting unit that may be used to dispense the frozen confectionary product in a dispensing machine according to the invention.

FIG. 10 and FIG. 11 depict an embodiment of the rotating table 3 and the cutting device 5 that may be used in an embodiment of the presently disclosed machine. The rotating table 3 may comprise a suction head 44 that may comprise grids configured to rotate, move up and down, and/or move sideways. The rotating table 3 may further comprise a detection system 43 to control the dispensing of the frozen confectionary product 28. The detection system 43 may comprise a distance measuring laser 40 and/or a laser curtain 41 to detect the amount of sauce and/or toppings dispensed into the container 8.

The detection system 43 may further detect if the frozen confectionary tubes 2, the topping tubes 10, and/or the sauce tubes 11 are below a pre-determined threshold. For example, the detection system 43 may be configured to control the replacement of one or more of the frozen confectionary tubes 2, the topping tubes 10, and/or the sauce tubes 11 when the frozen confectionary tubes 2, the topping tubes 10, and/or the sauce tubes 11 reach a minimum pre-determined threshold of content as will be discussed in greater detail later.

In an embodiment, the outlet 7 may comprise a conveyor sling 55 configured to move sideways to transfer the frozen confectionary product 28 from the serving unit 50 into the buffer unit 6 or from the buffer unit 6 into the serving unit 50.

FIG. 12

Figure 12:
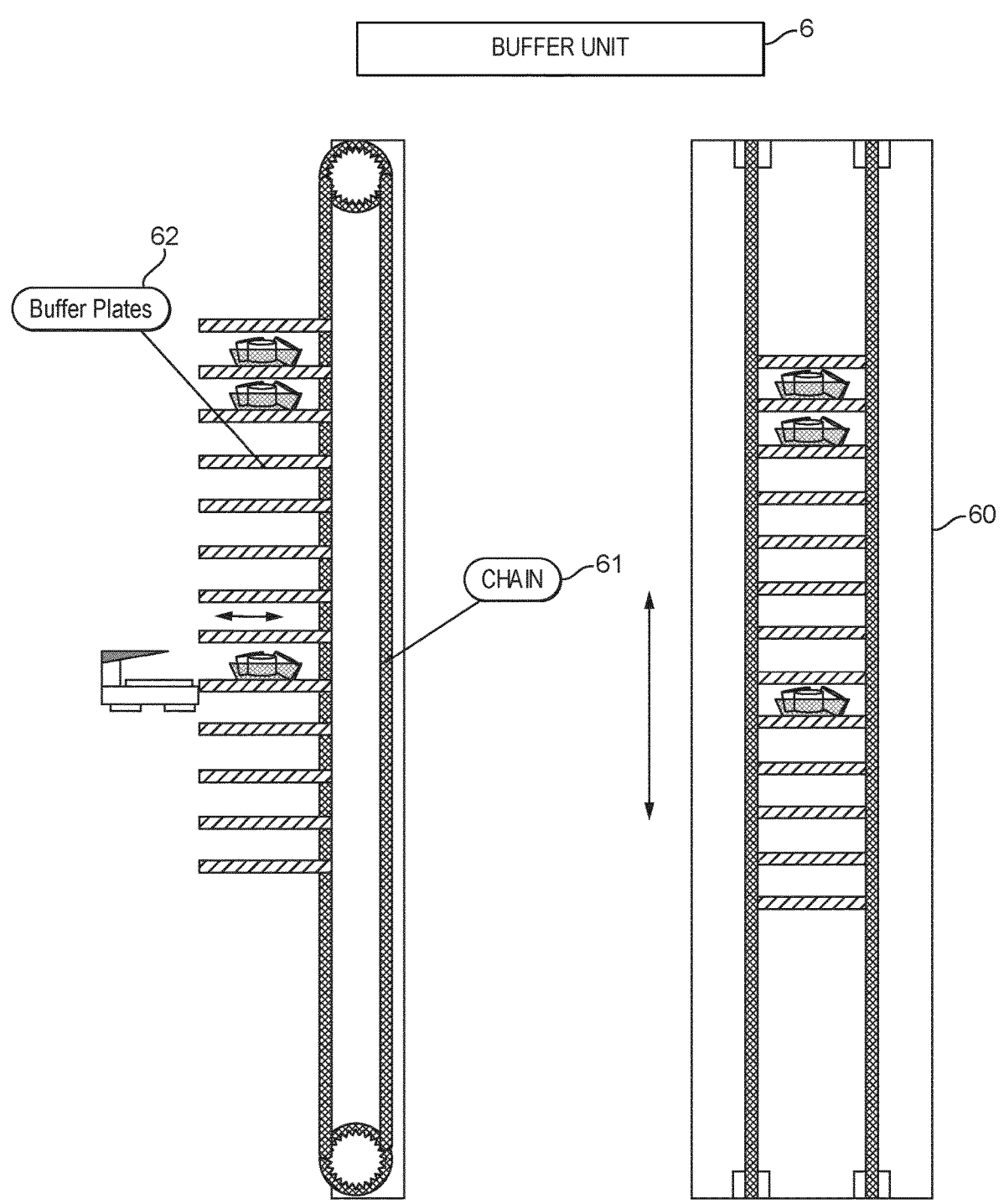
FIG. 12 is a view of a buffer unit that may be used to dispense the frozen confectionary product in a dispensing machine according to the invention.

FIG. 12 depicts an example of the buffer unit 6 that may be used in an embodiment of the presently disclosed machine. Preferably the buffer unit 6 may be provided to store and serve the frozen confectionary products 28. The buffer unit 6 may further transfer frozen confectionary products 28 that were not removed by a consumer from the outlet 7 in a pre-determined amount of time. The buffer unit 6 may comprise a chain 61 and/or one or more buffer plates 62. The frozen confectionary product may be loaded onto the one or more buffer plates 62 and/or moved up and down by the chain 61.

FIG. 13

Figure 13:
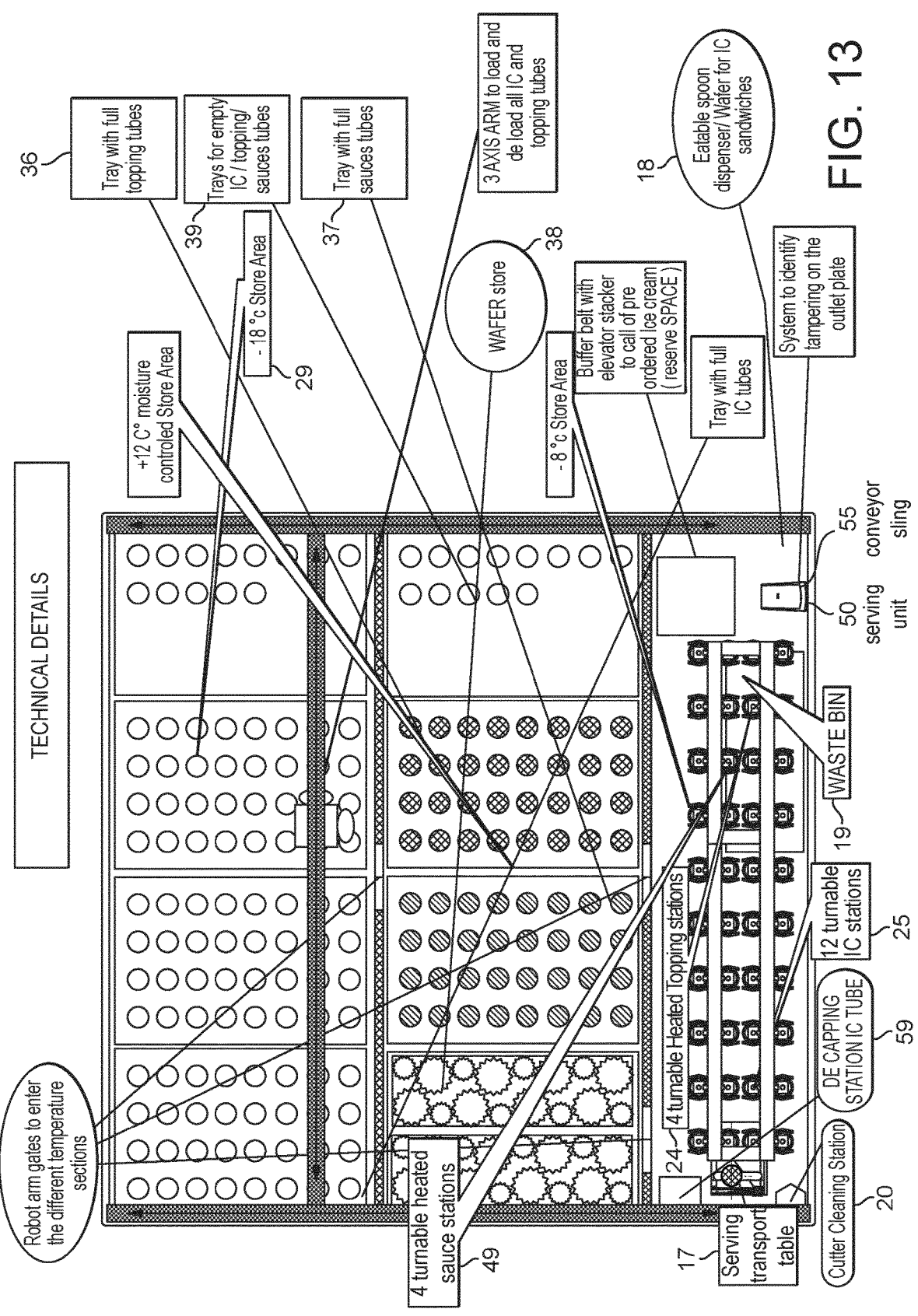
FIG. 13 is a schematic view of a dispensing machine that may be used to perform an embodiment of the methods disclosed herein.

FIG. 13 depicts an overview of the dispensing machine 1 according to the invention. Preferably the dispensing machine 1 can comprise at least three different temperature zones. Preferably the first zone may be kept at a temperature lower than the second and third zones. Preferably the second zone may be kept at a temperature lower than the third zone. For example, the first zone may be kept at a temperature of approximately −12° C. or less. The second zone may be kept at a temperature of approximately −10° C.-0° C. The third zone may be kept at a temperature of approximately 6° C.-12° C. Preferably the zones are moisture controlled.

Preferably the frozen confectionary tubes 2 may be stored in a frozen confectionary storage area 29 located in the first zone. Preferably the sauce tubes 11 and/or topping tubes 10 may be stored respectively in a sauce storage area 37 and a topping storage area 36 located in the third zone. Preferably a serving station 17 may be located in the second zone.

The serving station 17 may comprise a sealing cap removal station 59 to remove the sealing caps 83 from the frozen confectionary tubes 2, the sauce tubes 11, and/or the topping tubes 10 to allow the contents of the frozen confectionary tubes 2, the topping tubes 10, and/or the sauce tubes 11 to be dispensed. The serving station 17 may further comprise a frozen confectionary turntable 25 which can dispense one or more frozen confectionaries from the frozen confectionary tubes 2. The serving station 17 may further comprise a topping turntable 24 which can dispense one or more toppings from topping tubes 10. The serving station 17 may further comprise a sauce turntable 49 to dispense one or more sauces from the sauce tubes 11. Preferably the topping turntable 24 and/or the sauce turntable 49 are heated. For example, the topping turntable 24 and/or the sauce turntable 49 may comprise heated jackets for heating the topping tubes 10 and/or the sauce tubes 11. In an embodiment, the topping turntable 24 and/or sauce turntable 49 may comprise a heating coil and/or a heated plate.

In an embodiment, the topping turntable 24 may comprise an outlet valve (e.g., a star valve) to dispense a topping serving from the topping tubes 10. In an embodiment, the sauce turntable may comprise peristaltic pumps to dispense a sauce serving from the sauce tubes 11. The peristaltic pumps may be heated.

The dispensing machine 1 may further comprise an emptied tube storage area 39 for storing tubes that have lower than a pre-determined threshold amount of frozen confectionary and/or sauce and/or toppings. The arm 16 may move substantially emptied tubes to the emptied tube storage area 39.

The dispensing machine 1 may further comprise a spoon dispenser 18 configured to dispense spoons. For example, spoons may be placed in the container 8 or dispensed directly to the outlet 7. The dispensing machine 1 may further comprise a waste bin 19 to collect any unused containers 8 (e.g., wafers) and/or spoons.

In an embodiment, a cutter cleaning station 20 may be provided to clean the cutting device 5. For example, the cutting device 5 may be cleaned and sanitized by UV light.

FIG. 14

A non-limiting example of the method 100 is generally illustrated in FIG. 14. Some embodiments of the method 100 can omit one or more of the steps depicted in FIG. 14, and some embodiments of the method 100 can include one or more additional steps. The depicted steps are preferably performed in the order in which they are illustrated (as shown by arrows), but some embodiments can perform the steps in a different order. Indeed, the present disclosure is not limited to the specific embodiment shown in FIG. 14.

The method 100 generally may comprise receiving an indication of a selected frozen confectionary product; providing a container; loading one or more first tubes comprising a composition that is a frozen confectionary or a component of a frozen confectionary from a first storage tray located in a first storage area to a serving station; dispensing at least a portion of the composition that is a frozen confectionary or a component of a frozen confectionary from at least one of the one or more first tubes into the container; optionally placing a spoon into the container; and conveying the frozen confectionary product to an outlet. A detailed explanation of the method 100 now follows.

The method 100 can comprise receiving an indication of a selected frozen confectionary product 28 (Step 101). For example, the indication may be received by the controller 27 which may be at least partially located in the rotating table 3. The indication may comprise an amount and a type of frozen confectionary, an amount and a type of sauce, and an amount and a type of topping to be included in the frozen confectionary product 28. The indication may be provided by the user input device 56. In an embodiment the indication may be provided automatically in response to a user input at a location remote from the dispensing machine 1 (e.g., from an application on a mobile phone).

In an embodiment, the method 100 can comprise providing the container 8 to hold the frozen confectionary product 28 (Step 102). Preferably the container 8 is made of edible materials. For example, the container 8 can be a wafer plate or a wafer cup. In an embodiment, providing the container 8 comprises the arm 16 picking up and placing the container 8 on the rotating table 3. For example, the arm 16 may pick up the container 8 from a container storage area 38 using the suction head 30 and place the container 8 on the rotating table 3 to be filled with the frozen confectionary and, optionally, one or more toppings and/or sauces. The arm 16 may be configured to provide the container 8 automatically in response to a signal from the controller 27. In this manner, no user input is required to provide the container 8.

In an embodiment, providing the container 8 may comprise using the distance measuring laser 40 to check the integrity of the container 8. The distance measuring laser may be at least partially located on the rotating table 3. If the container 8 is cracked or broken, the arm 16 may automatically dispose of the container 8 in the waste bin 19 and select a new container 8. For example, the distance measuring laser 40 may send a signal to the controller 27 which can direct the arm 16, without user input, to dispose of the container 8 if the container 8 is broken or cracked.

The method 100 can comprise loading at least one frozen confectionary tube 2 from a storage tray 95 located in the frozen confectionary storage area 29 to the serving station 17 (Step 103). Preferably the arm 16 may be used to load the frozen confectionary tube 2 from the frozen confectionary storage tray 95 into the serving station 17 (shown in FIG. 15). For example, the arm 16 may be configured to rotate about 360° to remove the frozen confectionary tube 2 from the storage tray 95. The tube changer plate 33 preferably grips the frozen confectionary tube 2 and moves the frozen confectionary tube 2 to the serving station 17. The movable bar 33 of the arm 16 preferably moves up and down to rotate the frozen confectionary tube 2 into the proper position.

The method 100 can comprise dispensing a serving of the frozen confectionary into the container 8 (Step 104). In an embodiment, dispensing the serving of the frozen confectionary comprises positioning the container 8 under a first frozen confectionary tube 2 to receive a first frozen confectionary. Optionally the method 100 can comprise positioning the container 8 under a second frozen confectionary tube 2 to receive a second frozen confectionary additional or alternate to the first frozen confectionary. Optionally the method 100 can comprise positioning the container 8 under a third frozen confectionary tube 2 to receive a third frozen confectionary additional or alternative to the first frozen confectionary or the second frozen confectionary. It is contemplated any number of frozen confectionaries may be dispensed into the container 8. Preferably the frozen confectionary is disc shaped. However, additional shapes are contemplated such as a star, hexagon, square or polygon.

In a preferred embodiment, the arm 16 may be configured to load the frozen confectionary tubes 2 automatically without user input, most preferably by the controller 27 in direct response to the user input. For example, the controller 27 directs the arm 16 to load the frozen confectionary tubes 2 corresponding with the selected frozen confectionary product.

In an embodiment, dispensing the serving of the frozen confectionary comprises the servo drive 12 driving the jack screw 13 and/or the pusher plate 14 down a pre-determined distance dispense a serving of the frozen confectionary from the frozen confectionary tube 2. For example, a consumer may input a selected amount of a frozen confectionary into the user input device 56 and the controller 27 may be operable to control the servo drive 12, without user input, to dispense the selected amount of frozen confectionary from the frozen confectionary tube 2. In an embodiment, the cutting device 5 is used to cut the serving of frozen confectionary dispensed from the frozen confectionary tube 2. Preferably the controller 27 may be operable to control the cutting device 5 to cut the serving of frozen confectionary.

In an embodiment, after the frozen confectionary serving is dispensed from the frozen confectionary tube 2, the controller 27 may be operable to direct the arm 16 to return the frozen confectionary tube 2 containing any remaining frozen confectionary back to the frozen confectionary storage tray 95.

In an embodiment, the method 100 further comprises loading at least one sauce tube 11 from a storage tray 95 located in the sauce storage area 37 to the serving station 17 (Step 105). Optionally the arm 16 may transfer the sauce tubes 11 from the sauce storage area 37 to the serving station 17 and vice versa. Preferably the sauce tube 11 is placed on the sauce turntable 49 located in the serving station 17.

The method 100 may further comprise heating the sauce tube 11 prior to dispensing the sauce. For example, the sauce tube 11 may be heated in the serving station 17 by the sauce turntable 49. In such an embodiment, the sauce turntable 49 is heated. For example, the method 100 may comprise activating a heating plate located in the sauce turntable 49 to uniformly heat the sauce tube 11. In another example, the method may comprise using a heating coil located in the sauce turntable 49 to heat the sauce tube 11. In yet another example, the sauce tube 11 is placed in heated jackets located in the sauce turntable 49.

In an embodiment, the method 100 further comprises removing a sealing cap 83 from the sauce tube 11 to allow a serving of the sauce to be dispensed. For example, the sealing cap 83 can be removed at the sealing cap removal station 59. Optionally the sealing cap 83 may be pushed into the sauce tube 11 to allow dispensing of a serving of the sauce contained in the sauce tube 11.

In an embodiment, the method 100 comprises dispensing a serving of one or more sauces from one or more sauce tubes 11 into the container 8 (Step 106). Dispensing the serving of the sauce may comprise, for example, dispensing hot fudge into the container 8.

Preferably dispensing the serving of sauce comprises using the laser curtain 41 to detect the amount of sauce dispensed to ensure the correct amount of sauce is dispensed as determined by the controller 27. If the laser curtain 41 determines the correct amount of sauce has been dispensed, the container 8 may automatically proceed through the dispensing process without user input. If the laser curtain 41 determines not enough sauce has been dispensed, more sauce can automatically be dispensed. If the laser curtain 41 determines too much sauce has been dispensed, the container 8 may proceed through the dispensing process or the container 8 may be sent to the waste bin 19.

In an embodiment, the method 100 further comprises loading at least one topping tube 10 from a storage tray 95 located in the topping storage area 36 to the serving station 17 (Step 107). Optionally the arm 16 may transfer the topping tubes 10 from the topping storage area 36 to the serving station 17 and vice versa.

Optionally the method 100 further comprises dispensing a serving of one or more toppings from one or more topping tubes 10 into the container 8 (Step 108). Dispensing a serving of the topping may comprise, for example, dispensing nuts into the container 8.

In an embodiment, the laser curtain 41 may to determine if the correct amount of topping as determined by the controller 27 has been dispensed into the container 8. If the laser curtain 41 determines the correct amount of topping has been dispensed, the container 8 may automatically proceed through the dispensing process. If the laser curtain 41 determines not enough topping has been dispensed, more toppings will be dispensed. If the laser curtain 41 determines too much topping has been dispensed, the container 8 may proceed through the dispensing process or may be sent to the waste bin 19.

In an embodiment, the method 100 further comprises dispensing a spoon. For example, the method 100 may comprise placing a spoon into the container 8. In an embodiment, the spoon dispenser 18 may dispense the spoons. In an embodiment, the spoons are edible. In an embodiment, placing the spoon into the container 8 comprises using a gripper to pick up and place the spoon. In an embodiment, placing the spoon comprises placing the spoon into the container 8 prior to conveying the container 8 to the outlet 7. In an embodiment, placing the spoon comprises placing the spoon in the outlet 7 separately from the container 8.

In an embodiment, the frozen confectionary product 28 is provided to the outlet 7 (Step 108). In an embodiment, a consumer removes the frozen confectionary product from the outlet 7. Preferably the outlet 7 is visible to the consume In an embodiment, the method 100 comprises transferring the frozen confectionary product 28 to a buffer unit 6 if the consumer has not removed the frozen confectionary product 28 from the outlet 7 in a pre-determined amount of time. In an embodiment, a consumer may pre-order a frozen confectionary product 28. In such an embodiment, a buffer unit 6 with an elevator stacker can be used to store the frozen confectionary product 28 for a pre-determined amount of time and provide the pre-ordered frozen confectionary product 28 to the outlet 7. Preferably the conveyor sling 55 may be configured to transfer the frozen confectionary product 28 to the buffer unit 6 to remove a frozen confectionary product 28 located in the outlet 7 that has not been removed by a consumer within a pre-determined time.

In a preferred embodiment, the conveyor sling 55 automatically transfers the frozen confectionary product 28 to the buffer unit 6 without user input after a pre-determined amount of time has passed. For example, the serving unit 50 may comprise a timer configured to measure the amount of time a frozen confectionary product 28 has been placed on the serving unit 50. Preferably, in response to a signal from the serving unit 50, the conveyor sling 55 may transfer the frozen confectionary product 28 to the buffer unit 6.

In an embodiment, the method 100 may comprise receiving the storage tray 95 comprising the frozen confectionary tubes 2, the topping tubes 10, and/or the sauce tubes 11 from a production facility. In such an embodiment, the service doors 9 may be configured to open and receive the storage tray 95. For example, the service doors 9 may comprise sliding skids configured to be pulled out to receive the storage tray 95. As a result, the frozen confectionary tubes 2, the topping tubes 10, and/or the sauce tubes 11 can advantageously be easily inserted and removed from the dispensing machine 1. In an embodiment, the service doors 9 may comprise alarms. Preferably the frozen confectionary tubes 2 are shipped in a refrigerated box from the production facility.

In an embodiment, the method 100 may comprise detecting if the amount of frozen confectionary, sauces, and/or toppings in the frozen confectionary tubes 2, the sauce tubes 11, and/or the topping tubes 10 is lower than a pre-determined threshold. For example, less than ten percent full. Preferably if the system detects the frozen confectionary tubes 2, the topping tubes 10, and/or the sauce tubes 11 are lower than a pre-determined threshold, the system will trigger an exchange for a replacement tube. In an embodiment, the detection system 43 may determine if the frozen confectionary tubes 2, the topping tubes 10, and/or the sauce tubes 11 are lower than a pre-determined threshold. If the frozen confectionary tubes 2, the topping tubes 10, and/or the sauce tubes 11 are lower than a pre-determined threshold, the dispensing machine 1 can automatically contact a production facility (e.g., through wireless communication) to order more frozen confectionary tubes 2, topping tubes 10, and/or sauce tubes 11 as will be discussed later in greater detail.

In an embodiment, the substantially emptied tubes are moved to an empty tube tray 39 located in the dispensing machine 1. Preferably the emptied tubes are then removed and transported to a remote location (e.g., the production facility or an intermediate location) to be cleaned and reused.

FIG. 15

Figure 15:
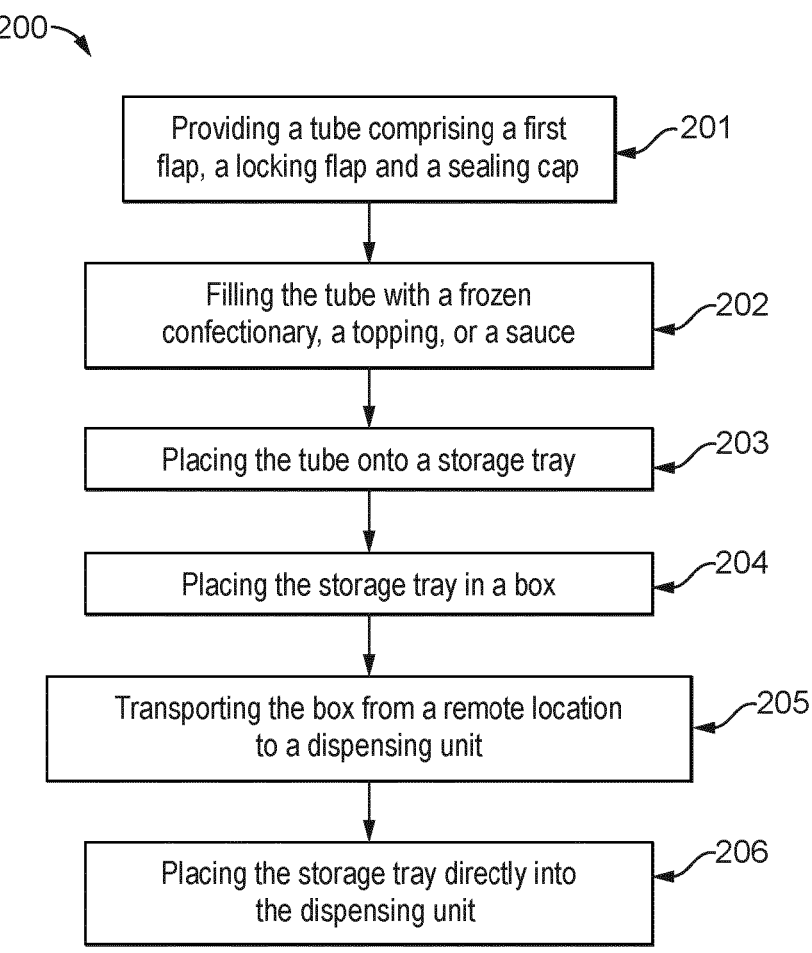
FIG. 15 is a flowchart showing a non-limiting example of a method of making use of a dispensing machine according to the invention herein.

Another aspect of the present disclosure is a method 200 of supplying frozen confectionary and/or frozen confectionary components to a dispensing machine. A non-limiting example of the method 200 is generally illustrated in FIG. 15. Some embodiments of the method 200 can omit one or more of the steps depicted in FIG. 15, and some embodiments of the method 200 can include one or more additional steps. The depicted steps are preferably performed in the order in which they are illustrated (as shown by arrows), but some embodiments can perform the steps in a different order. Indeed, the present disclosure is not limited to the specific embodiment shown in FIG. 15.

The method 200 preferably comprises providing a tube with a first flap, a locking flap and a sealing cap; filling at least a portion of the tube with a frozen confectionary, a sauce, or a topping; placing the tube onto a storage tray; transporting the storage tray containing the tubes to a dispensing machine 1; and placing the storage tray directly into the dispensing machine 1 without removing the tubes from the storage tray or removing the contents from the tubes. A detailed description of the method 200 now follows. In an embodiment, the tube may be a frozen confectionary tube 2, a topping tube 10 and/or a sauce tube 11.

In an embodiment, the method 200 comprises providing a tube comprising a first flap 71 to avoid slipping during the movement of the tube (Step 101). In an embodiment, the method 200 may comprise providing a tube comprising one or more locking flaps 82 configured to lock the frozen confectionary tube 2 into the transport tray 95. In an embodiment, the method 200 comprises providing a tube with at least one sealing cap 83. In an embodiment, the method 200 comprises providing a tube with a sliding gate 91.

In an embodiment, the method 200 comprises filling the tube with a frozen confectionary, sauce, and/or topping (Step 202). The tube may be filled at a production facility.

In an embodiment, the method 200 comprises placing the tubes on a storage tray 95 (Step 203). Placing the tubes on the storage tray 95 may comprise using the one or more locking flaps 82 to lock the tubes onto the storage tray 95.

In an embodiment, the method 200 comprises placing the storage tray 95 in a box (Step 204). In an embodiment, the box may be a refrigerated box.

In an embodiment, the method 200 may comprise transporting the box from a remote location to the dispensing machine 1 (Step 205).

In an embodiment, the method 200 may comprise placing the storage tray 95 directly into the dispensing machine 1 without removing the tubes from the storage tray 95. In such an embodiment, the service doors 9 may be configured to open and receive the storage tray 95. For example, the service doors 9 may comprise sliding skids configured to be pulled out to receive the storage tray 95. As a result, the tubes can advantageously be easily inserted and removed from the dispensing machine 1.

In an embodiment, the method 200 further comprises cleaning the tubes prior to providing the tubes to be filled with a frozen confectionary, sauce, and/or topping. The cleaning may be performed at a different location than the dispensing machine 1. Preferably cleaning the tubes comprises cleaning the tubes with hot water and sanitizing the tubes. For example, water at a temperature of about 90° C. can be used.

As a non-limiting example, the cleaning can comprise ultra-sonic cleaning such as a pH 12 ultra-sonic bath (e.g., at a pH of about 12.0); and the tubes can comprise or consist of materials that can withstand such washing. However, the present disclosure is not limited to a specific embodiment of the cleaning, and the cleaning can be any means known in the art that reduces the residual material on the tubes.

A method for real-time ordering and inventory management of the dispensing machine 1 is also disclosed. The method comprises detecting if one or more tubes have an amount of content lower than a pre-determined threshold and automatically ordering replacement tubes from a remote location and/or automatically producing a frozen confectionary product or component thereof. In a preferred embodiment, the remote location is a production facility.

For example, the dispensing machine 1 may be in in direct communication with the production facility (e.g., a wireless communication connection). When the contents of the frozen confectionary tubes 2, the sauce tubes 11, and/or topping tubes 10 are lower than a pre-determined threshold, the dispensing machine 1 can alert the production facility that more tubes are needed and/or the tubes are automatically shipped from the production facility to the dispensing machine 1. Preferably the replacement tubes are shipped automatically after receiving an indication from the dispensing machine 1 with minimum or no user input.

In an embodiment, the method for real-time ordering and inventory management further comprises receiving an indication at a location remote from the dispensing machine the production facility that the empty tube tray 39 is full. In such an embodiment, the dispensing machine 1 can alert the remote location that the empty tube tray 39 is full and the remote location automatically arranges for removal of the empty tube tray 39 from the dispensing machine 1. In a preferred embodiment, the remote location is a production facility. The empty tube tray 39 may then be shipped to the remote location which can clean and optionally reuse the tubes located on the empty tube tray 39.

Figures 16A, 16B:
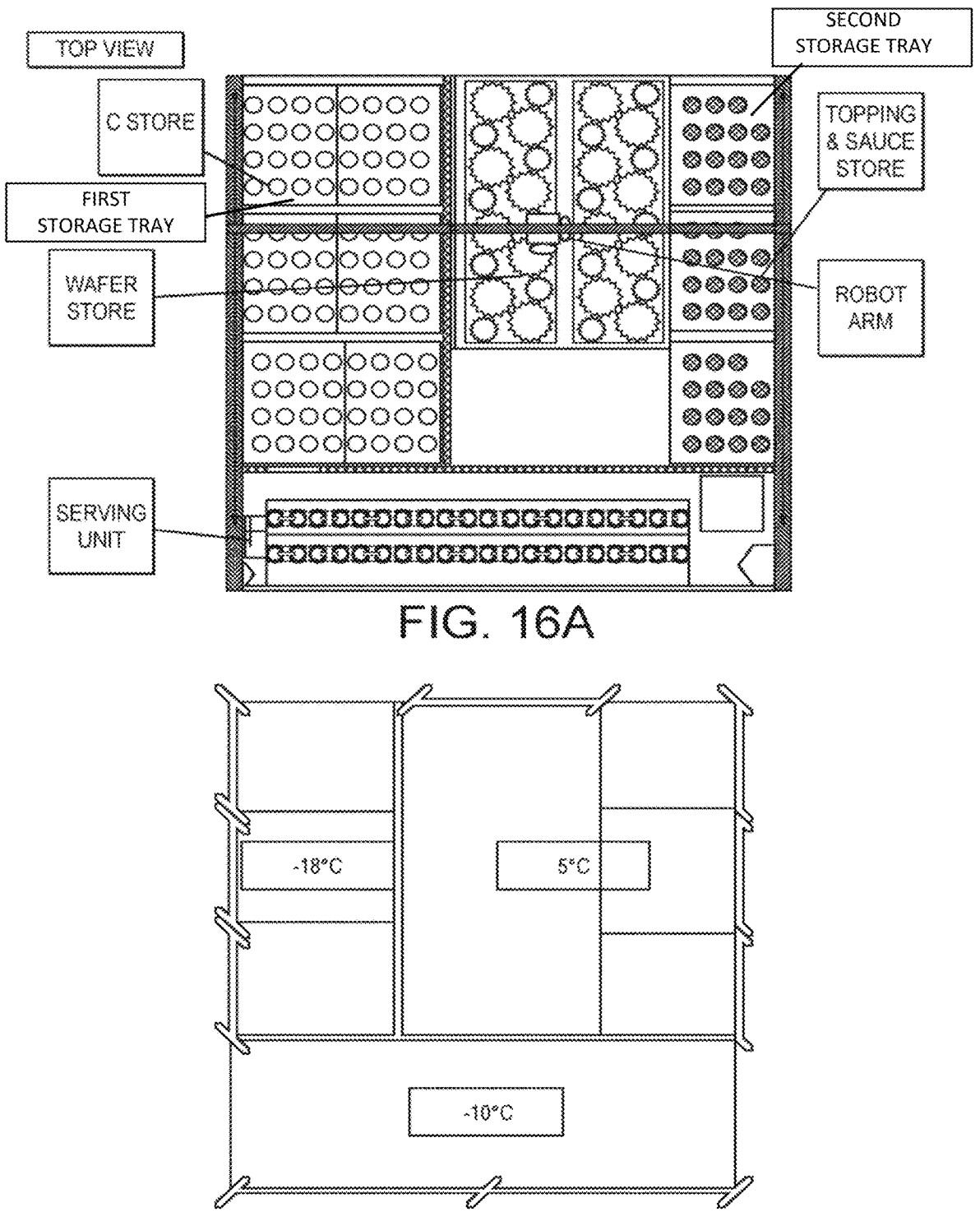
FIG. 16A is a top view of a dispensing machine according to the invention.
FIG. 16B is a top view of a dispensing machine according to the invention with temperature zones indicated.

As noted above, some embodiments of the methods 100 and 200 can omit one or more of the steps depicted in the figures, and some embodiments of the methods 100 and 200 can include one or more additional steps. The depicted steps are preferably performed in the order in which they are illustrated (as shown by arrows), but some embodiments can perform the steps in a different order. Indeed, the present disclosure is not limited to the specific embodiments shown in FIGS. 15 and 16.
FIG. 16A; FIG. 16B FIG. 16A is a top view of a dispensing machine according to the invention. It shows an alternative layout of the positions of the first storage area, the second storage and the serving station. FIG. 16B is a top view of a dispensing machine according to the invention with temperature zones indicated. The layout shows that the first storage area is positioned in the first zone which has a temperature of −18° C., the serving station is positioned in a second zone which has a temperature of −10° C., and the second storage area is positioned in a third zone, the temperature of the third zone is ambient e.g. 6° C.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A dispensing machine for dispensing a frozen confectionary product, the dispensing machine comprising:

a first storage area for storing a first storage tray with one or more first tubes in the dispensing machine, a serving station for receiving one or more first tubes comprising a frozen confectionary or a frozen confectionary component from the first storage tray, the serving station comprises:

a first position under the one or more first tubes for receiving a container, a member configured for extruding the frozen confectionary out of the one or more first tubes located in the serving station, a cutting device configured for cutting at least a portion of the frozen confectionary into the container, a member configured for transferring the one or more first tubes in the first storage area to the serving station and from the serving station to the first storage area, and wherein the one or more first tubes are reusable;

at least two zones, the at least two zones comprising a first zone wherein the temperature is lower than the temperature in a second zone, and wherein the first storage area is located in the first zone and the serving station is located in the second zone;

a member configured for detecting when contents of one of the one or more first tubes is below a pre-determined threshold; and a member configured for moving the one of the one or more first tubes having contents below the pre-determined threshold into an empty tube location in a tray located in the dispensing machine.

2. The dispensing machine according to claim 1, wherein the dispensing machine comprises a second storage area separate from the first storage area for storing a second storage tray comprising one or more second tubes comprising an additional component, and a member for transferring the one or more second tubes from the second storage area to the serving station, and wherein the serving station comprises a second position under the one or more second tubes for receiving the container.

3. The dispensing machine according to claim 1, wherein the dispensing machine comprises a third zone wherein a second storage area is positioned, and wherein the temperature of the third zone is higher than the temperature of the first zone.

4. The dispensing machine according to claim 3, wherein the temperature of the first zone is −20--16° C., the temperature of the second zone is −10--6° C., and the temperature of the third zone is 6-8° C.

5. The dispensing machine according to claim 1, wherein the member configured for transferring the one or more first tubes is a robotic arm.

6. The dispensing machine according to claim 1, wherein the dispensing machine comprises a member configured for conveying the frozen confectionary product to an outlet on the dispensing machine.

7. The dispensing machine according to claim 2, wherein the dispensing machine comprises heaters for heating the one or more second tubes in the serving station prior to dispensing the portion of the additional component of the frozen confectionary into the container.

8. The dispensing machine according to claim 1, wherein the dispensing machine comprises a user interface for receiving an indication of a type of frozen confectionary product to be dispensed.

9. The dispensing machine according to claim 1, wherein each of the one or more first tubes comprises a first flap located on a first end of each tube, a second locking flap located on a second end of each tube.

10. The dispensing machine according to claim 1, wherein each of the one or more first tubes comprises a sealing cap.

11. The dispensing machine according to claim 1, wherein the dispensing machine comprises a door configured for opening to receive and remove trays with tubes.

12. A dispensing machine for dispensing a frozen confectionary product, the dispensing machine comprising:

a first storage area for storing a first storage tray with one or more first tubes in the dispensing machine, a serving station for receiving one or more first tubes comprising a frozen confectionary or a frozen confectionary component from the first storage tray, the serving station comprises:

a first position under the one or more first tubes for
receiving a container, a member configured for extruding the frozen confection-
ary out of the one or more first tubes located in the
serving station, a cutting device configured for cutting at least a portion of
the frozen confectionary into the container, a member configured for transferring the one or more first
tubes in the first storage area to the serving station and
from the serving station to the first storage area, and
wherein the one or more first tubes are reusable;

at least two zones, the at least two zones comprising a first
zone wherein the temperature is lower than the tem-
perature in a second zone, and wherein the first storage
area is located in the first zone and the serving station
is located in the second zone; and a buffer unit located in the dispensing machine, wherein
the buffer unit is configured for storing the frozen
confectionary product prior to conveying, by a member
configured for conveying the frozen confectionary
product to an outlet on the dispensing machine, the
frozen confectionary product to the outlet.

13. The dispensing machine according to claim 1, wherein
the dispensing machine comprises a rotating table located in
the dispensing machine.

14. The dispensing machine according to claim 1, wherein
the one or more first tubes have an inner profile having a
shape selected from the group consisting of a disc, a star, a
hexagon, a square and a polygon.

* * * * *